United States Patent
Song et al.

(10) Patent No.: US 11,965,089 B2
(45) Date of Patent: Apr. 23, 2024

(54) MICROSPHERIC IONOMER HAVING CROSS-LINKED STRUCTURE, PREPARATION METHOD THEREFOR, APPLICATIONS THEREOF, AND PREPARATION SYSTEM THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Wenbo Song, Beijing (CN); Hao Yuan, Beijing (CN); Zhenjie Liu, Beijing (CN); Jinliang Qiao, Beijing (CN); Shijun Zhang, Beijing (CN); Hua Yin, Beijing (CN); Huijie Hu, Beijing (CN); Qing Shao, Beijing (CN); Jie Zhang, Beijing (CN); Xiaomeng Zhang, Beijing (CN); Dezhan Li, Beijing (CN); Fuyong Bi, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 836 days.

(21) Appl. No.: 16/758,839
(22) PCT Filed: Oct. 25, 2018
(86) PCT No.: PCT/CN2018/111825
§ 371 (c)(1),
(2) Date: Apr. 23, 2020
(87) PCT Pub. No.: WO2019/080891
PCT Pub. Date: May 2, 2019

(65) Prior Publication Data
US 2021/0179842 A1 Jun. 17, 2021

(30) Foreign Application Priority Data

Oct. 25, 2017 (CN) .......................... 201711016388.4
Oct. 25, 2017 (CN) .......................... 201711016466.0

(51) Int. Cl.
*C08L 67/02* (2006.01)
*C08F 212/08* (2006.01)
(Continued)

(52) U.S. Cl.
CPC ............ *C08L 67/02* (2013.01); *C08F 212/08* (2013.01); *C08F 212/36* (2013.01);
(Continued)

(58) Field of Classification Search
CPC ........ C08L 67/02; C08L 35/06; C08F 222/06; C08F 2500/14; C08F 212/36; C08F 2810/20; C08F 212/08
See application file for complete search history.

(56) References Cited

U.S. PATENT DOCUMENTS 4,511,527 A * 4/1985 Dolce ..................... C08L 67/02
528/308.4

FOREIGN PATENT DOCUMENTS

| CN | 101260167 A | 9/2008 |
| CN | 101338008 A | 1/2009 |

(Continued)

OTHER PUBLICATIONS

Extended European search report for EP Application No. 18871366.3, dated Jul. 15, 2021.

(Continued)

*Primary Examiner* — Robert D Harlan
(74) *Attorney, Agent, or Firm* — FINNEGAN, HENDERSON, FARABOW, GARRETT & DUNNER LLP

(57) ABSTRACT

A microspheric ionomer having a cross-linked structure, a preparation method therefor, applications thereof, and a preparation system thereof. The ionomer comprises structure units A represented by formula (1), structure units B represented by formula (2), and a cross-linking structure provided by a cross-linking agent, M being separately selected from H, a metal cation, and a straight chain, a saturated alkyl of branched or ring-shaped $C_1$-$C_{20}$, R being H or a methyl; and metal cations are introduced to part of structure units A in the ionomer. The ionomer shows an outstanding effect on nucleation of PET, serves as a nucleating agent for PET modification, so as to obtain a corresponding PET composition. A system and method for continuously preparing maleic acid ester ionomer microspheres and cross-linked maleic acid ionomer microspheres, so as to achieve continuous preparation, washing and separation of ionomer microspheres, effectively stabilizes the separation effect, and avoids frequent start and stop operations of a centrifuge.

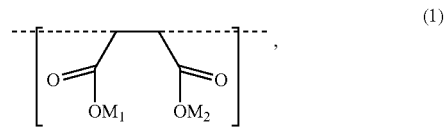

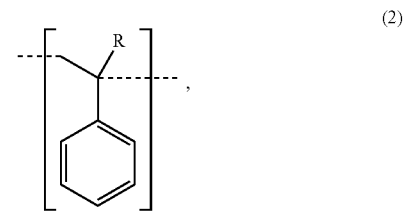

50 Claims, 9 Drawing Sheets

(51) Int. Cl.
*C08F 212/36* (2006.01)
*C08F 222/06* (2006.01)
*C08L 35/06* (2006.01)

(52) U.S. Cl.
CPC ............ *C08F 222/06* (2013.01); *C08L 35/06* (2013.01); *C08F 2500/24* (2013.01); *C08F 2810/20* (2013.01)

(56) References Cited

FOREIGN PATENT DOCUMENTS

| | | | |
|---|---|---|---|
| CN | 102924641 | A | 2/2013 |
| CN | 103145903 | A | 6/2013 |
| CN | 103408685 | B | 10/2015 |
| EP | 0255735 | | 2/1998 |

OTHER PUBLICATIONS

Xiang, H., Emulsion Polymerization of VC-VA$_c$-MAH and Study on Structure/Performance of Copolymer. *Chinese Master's Theses Full-text Database Engineering Science and Technology I*: 2014-6 (2014).

Chen, C., Study on Self-stable Precipitation Polymerization of Maleic Anhydride and A-Methyl Styrene and Reinitiation of Copolymer. *Chinese Master's Theses Full-text Database Engineering Science and Technology I*: vol. 1 (2011).

Xiong, Q., Synthesis and Properties of Copolymer Emulsion of Styrene, Maleic Anhydride and Its Derivatives. *Chinese Master's Theses Full-text Database Engineering Science and Technology I*: 2013-7 (2013).

International Search Report for International Application No. PCT/CN2018/111825, dated Jan. 29, 2019.

\* cited by examiner

MICROSPHERIC IONOMER HAVING CROSS-LINKED STRUCTURE, PREPARATION METHOD THEREFOR, APPLICATIONS THEREOF, AND PREPARATION SYSTEM THEREOF

CROSS-REFERENCE TO RELATED APPLICATIONS

This application is a national stage filing under 35 U.S.C. § 371 of International Application No. PCT/CN2018/111825, filed Oct. 25, 2018, which claims the priority to and benefits of Chinese Patent Application No. 201711016388.4, filed Oct. 25, 2017, and Chinese Patent Application No. 201711016466.0, filed Oct. 25, 2017, which are incorporated herein by reference in their entireties.

TECHNICAL FIELD

The invention relates to the field of polymer materials, particularly, to a microspheric ionomer having a cross-linked structure, and a preparation method therefor and applications thereof. The invention also relates to continuous production of cross-linked ionomer microspheres, particularly, to a system and method for the continuous preparation of the cross-linked maleic acid ester ionomer microspheres and cross-linked maleic acid ionomer microspheres according to the invention.

BACKGROUND ART

Ionic polymers, also called ionomers for short, are a type of polymer materials with a small number of ionic groups on the polymer chain, wherein the molar content of the ionic groups generally does not exceed 15%. Ionomers are a unity of perfect combination of inorganic ions and organic molecules. Due to the introduction of ionic groups, there are special interactions between the molecules in the ionomers, which are not found in ordinary polymers, such as ion-ion interactions; ion-ion pair interactions; ion-dipole interactions; and interactions of hydrogen bonds. These special interactions make ionomers possess many unique properties and have important applications in such aspects as polymer modification and functional materials. In addition, current research on the preparation and application of polymer microspheres is a hot topic in the field of functional polymer materials. Nano-scale to micron-scale polymer microspheres have special properties such as large specific surface area, strong adsorption, strong cohesion and strong surface reaction capability, and can be widely used in many high-tech fields.

Yan Zhe, Qiang Xihuai, et al., describes preparation of the sodium salt of higher fatty alcohol monoester of styrene/maleic anhydride copolymer using 1,4-dioxane as the solvent and p-toluene sulfonic acid as the catalyst, in the article "Preparation and Surface Activity of Sodium Salt of Fatty Alcohol Monoester of Styrene/Maleic Anhydride Copolymer" ("China Surfactant Detergent & Cosmetics", 2012, 42 (2): 97-100).

Lai Xiaolin, Sun Chengdong, et al., describes preparation of the ethyl ester of styrene/maleic anhydride copolymer, using methyl ethyl ketone as the solvent and triethylamine as the catalyst, in the article "Synthesis and pH-sensitive property of SMA-ethanol" ("Applied Chemical Industry" 2008, 37 (5): 498-501). The reaction mixture was precipitated in petroleum ether, suction filtered, followed by drying, re-dissolving in tetrahydrofuran, precipitating again in petroleum ether, filtering and drying, to obtain the product.

However, in industrial production, both the polymer microspheres and the ionomer microspheres must face the washing and purification of ultrafine particles and solid-liquid separation. At present, the commonly-used method is to use a three-feet centrifuge or a plate-and-frame filter, which involves air exposure operation, and needs to be improved in process continuity and safety.

CN 102924641 A discloses a nucleating agent for polyethylene terephthalate (PET) and a preparation method thereof. The nucleating agent is a styrene/maleic acid ionomer prepared from a random copolymer or an alternating copolymer of styrene and maleic anhydride via hydrolysis, salinization and purification. The preparation method comprises: uniformly mixing maleic anhydride monomer, styrene monomer, an initiator and a solvent, in nitrogen atmosphere, heating to 60-80° C. for reaction for 1-1.5 hours, followed by precipitating the reaction product in a solvent, purifying, drying under vacuum, to obtain a copolymer, then dissolving the copolymer in 1,4-dioxane, and adding dropwise an alcohol solution of a base, precipitating the produced ionomer from the precipitating agent, followed by vacuum filtration and purification, to obtain styrene/maleic acid ionomer. The ionomer can increase the crystallization temperature of PET and accelerate the crystallization rate.

CN 103145903 A discloses a nucleating agent for polyethylene terephthalate (PET) and a preparation method thereof. The nucleating agent is a polystyrene-b-poly(styrene-alt-maleic anhydride) diblock ionomer prepared from a polystyrene-b-poly(styrene-alt-maleic anhydride) diblock copolymer by hydrolysis, salinization, and purification. The nucleating agent can form microphase separation in the PET melt, thereby providing crystal nucleus for PET crystallization.

However, there is still room to improve the polymer prepared by the above method in terms of the effect on nucleation of PET.

SUMMARY OF THE INVENTION

A first object of the invention is to provide a microspheric ionomer having a cross-linked structure, and a preparation method therefor and applications thereof. The microspheric ionomer overcomes the deficiencies in the prior art and has good effect on nucleation of PET.

Another object of the invention is to provide a system and method for the continuous preparation of the cross-linked maleic acid ester ionomer microspheres and cross-linked maleic acid ionomer microspheres according to the invention, which can well overcome the problems in industrialization production regarding difficult washing and purification of ultra-fine particles and difficult solid-liquid separation.

To achieve the above objects, a first aspect of the invention provides a microspheric ionomer having a cross-linked structure, the ionomer comprising a structure unit A represented by formula (1), a structure unit B represented by formula (2) and a cross-linking structural unit provided by a cross-linking agent,

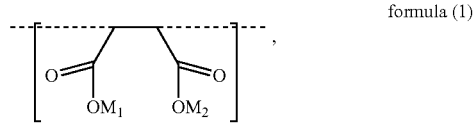

formula (1)

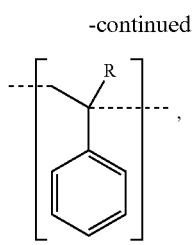

formula (2)

wherein, $M_1$ and $M_2$ are each independently selected from the group consisting of H, a metal cation and a linear, branched or cyclic $C_1$-$C_{20}$ saturated alkyl group, and R is H or methyl;

at least part of the structure units A in the ionomer comprise the incorporated metal cation.

A second aspect of the invention provides a method for preparing an ionomer according to the invention, the method comprising:

(1) contacting maleic anhydride, a monomer MB providing a structure unit B represented by formula (2), and a cross-linking agent, in an organic solvent, in the presence of an initiator, to react;

(2) ring-opening step: ring-opening the maleic anhydride unit in the product obtained in step (1).

The ionomer (or ionomer microsphere) of the invention has cross-linked and microspheric structures, and has good effect on nucleation of PET. Moreover, its preparation method is simple, wherein ionomer microspheres can be obtained via a simple separation operation without the use of a precipitating agent after the end of the reaction. Thus such a preparation method is also environmentally friendly. In one embodiment, the ionomer can be prepared by a one-pot process, and the suspension after polymerization does not need to be separated and dried, but directly reacts with a base, which thereby further simplifies the process and reduces energy consumption.

In one embodiment of the second aspect, the invention provides a method for preparing cross-linked maleic acid ester ionomer microspheres, comprising:

(1) subjecting maleic anhydride and a monomer MB represented by formula (I) to copolymerization in a copolymerization unit in the presence of an initiator, a cross-linking agent and a reaction solvent, to obtain a polymer mother liquid containing maleic anhydride-based copolymer microspheres,

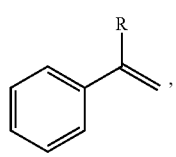

formula (I)

R being H or methyl;

(2) subjecting the polymer mother liquid to a continuous first separation to obtain a separated solid-containing phase and a separation liquid-1;

(3) feeding the separated solid-containing phase into a washing unit, for performing at least one alcohol washing and a continuous second separation, to obtain a copolymer slag phase and a washing clear liquid;

(4) reacting the copolymer slag phase with an alcohol solution of a base, and continuously subjecting the obtained product to a third separation, to obtain a centrifuged slag phase containing ionomer microspheres, and a separation liquid-II;

(5) sending the centrifuged slag phase to a drying unit for drying, to obtain cross-linked maleic acid ester ionomer microspheres; and (6) introducing the separation liquid-I, separation liquid-II and washing clear liquid to a solvent recovery unit, and returning the recovered solvent and recovered alcohol obtained by recovery to steps (1) and (3), respectively.

Correspondingly, the invention also provides a system for carrying out such a method for preparing cross-linked maleic acid ester ionomer microspheres, the system comprising:

a copolymerization unit, a washing unit, an ionomer-forming reaction unit, a drying unit, and a solvent recovery unit that are communicated sequentially, wherein:

the copolymerization unit is used for a copolymerization reaction of comonomers, and for continuously subjecting the obtained polymer mother liquid containing maleic anhydride-based copolymer microspheres to a first separation to obtain a separated solid-containing phase and a separation liquid-I;

the washing unit is used for subjecting the separated solid-containing phase to at least one alcohol washing and a continuous second separation to obtain a copolymer slag phase and a washing clear liquid;

the ionomer-forming reaction unit is used for reacting the copolymer slag phase, and for continuously subjecting the prepared ionomer reaction liquid to a third separation to obtain a centrifuged slag phase containing ionomer microspheres and a separation liquid-II;

the drying unit is used for drying the centrifuged slag phase to obtain the cross-linked maleic acid ester ionomer microspheres;

the solvent recovery unit is used for removing impurities from the separation liquid-I, separation liquid-II and washing clear liquid, and returning the recovered solvent and recovered alcohol obtained by separation to the copolymerization unit and the washing unit, respectively; and this system is used to achieve continuous production of the cross-linked maleic acid ester ionomer microspheres.

In another embodiment of the second aspect, the invention provides a method for preparing cross-linked maleic acid ionomer microspheres, comprising:

(1) subjecting maleic anhydride and a monomer MB represented by formula (I) to copolymerization in a copolymerization unit in the presence of an initiator, a cross-linking agent, and a reaction solvent, to obtain a polymer mother liquid containing maleic anhydride-based copolymer microspheres,

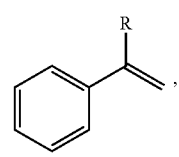

formula (I)

R being H or methyl;
(2) subjecting the polymer mother liquid to a continuous first separation to obtain a separated solid-containing phase and a separation liquid-I;
(3) reacting the separated solid-containing phase with an alkali liquid, and continuously subjecting the obtained product to a second separation, to obtain a centrifuged slag phase containing ionomer microspheres, an aqueous phase and a separation liquid-II;
(4) introducing the centrifuged slag phase to a washing unit, for performing at least one alcohol washing and a third separation, to obtain an ionomer slag phase and a washing clear liquid;
(5) sending the ionomer slag phase to a drying unit for drying, to obtain cross-linked maleic acid ionomer microspheres; and
(6) introducing the separation liquid-I, the separation liquid-II and the washing clear liquid to a solvent recovery unit, and returning the recovered solvent and recovered alcohol obtained by recovery to steps (1) and (4), respectively.

Correspondingly, the invention also provides a system for carrying out such a method for preparing cross-linked maleic acid ionomer microspheres, the system comprising:
a copolymerization unit, an ionomer-forming reaction unit, a washing unit, a drying unit, and a solvent recovery unit that are communicated sequentially, wherein:
the copolymerization unit is used for a copolymerization reaction of comonomers, and for continuously subjecting the obtained polymer mother liquid containing the maleic anhydride-based copolymer microspheres to a first separation, to obtain a separated solid-containing phase and a separation liquid-I;
the ionomer-forming reaction unit is used for reacting the separated solid-containing phase, and for continuously subjecting the prepared product to a second separation to obtain a centrifuged slag phase containing ionomer microspheres, an aqueous phase and a separation liquid-II;
the washing unit is used for subjecting the centrifuged slag phase to at least one alcohol washing and a continuous third separation, to obtain an ionomer slag phase and a washing clear liquid;
the drying unit is used for drying the ionomer slag phase to obtain the cross-linked maleic acid ionomer microspheres;
the solvent recovery unit is used for removing impurities from the separation liquid-I, separation liquid-II and washing clear liquid, and returning the recovered solvent and recovered alcohol obtained by separation to the copolymerization unit and the washing unit, respectively; and
this system is used to achieve continuous production of the cross-linked maleic acid ionomer microspheres.

Through the above technical solutions, the invention provides a system and method that can achieve continuous preparation of maleic acid ester and maleic acid ionomers having cross-linked and microspheric structures. The process of the method can achieve continuous solid-liquid centrifugal separation of the ultra-fine copolymerizates or ionomer microspheres from the solvent, and the used reaction solvent and washing alcohol solvent can be recycled. The method provided by the invention can eliminate the manually-operated separation process adopted between various units of the system in the prior art, can effectively prevent the solvent from air exposure operation, achieve the continuous reaction, washing and separation processes in the preparation of ionomer microspheres, effectively stabilize the separation effect, and avoid frequent start and stop operations of a centrifuge. The average particle size of the obtained microspheres can be 600-2000 nm.

A third aspect of the invention provides the use of an ionomer according to the invention as a nucleating agent for modifying polyethylene terephthalate.

A fourth aspect of the invention provides a polyethylene terephthalate composition, comprising an ionomer according to the invention as a nucleating agent.

A fifth aspect of the invention provides a method for modifying polyethylene terephthalate, wherein an ionomer according to the invention is introduced into polyethylene terephthalate as a nucleating agent.

DETAILED DESCRIPTION OF THE INVENTION

Microspheric Ionomer

Figure 1:
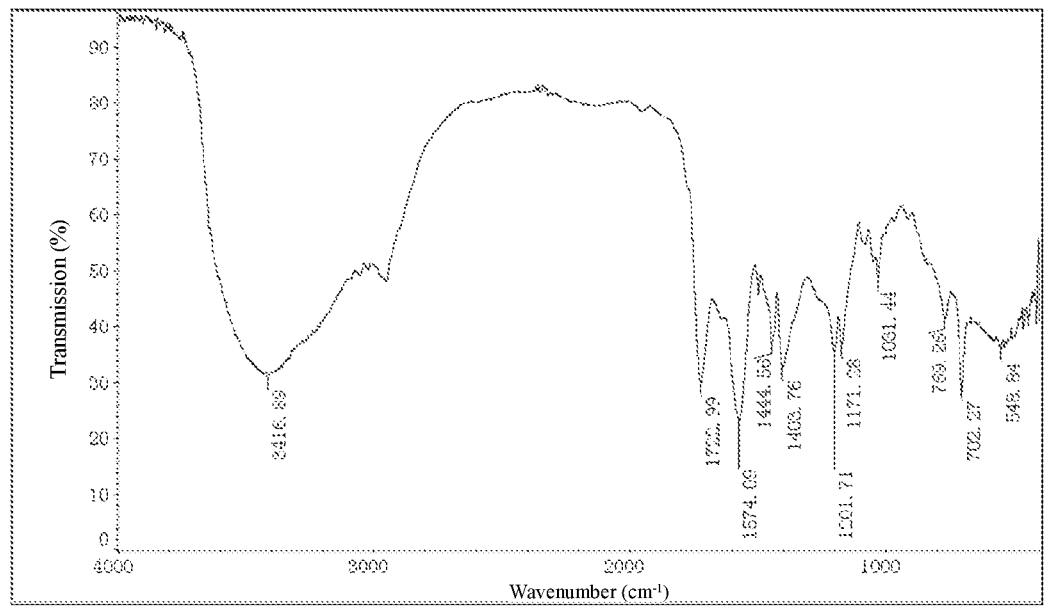
FIG. 1 is an infrared spectrum of the ionomer synthesized in Example 1.

The microspheric ionomer having a cross-linked structure provided by the invention comprises a structure unit A represented by formula (1), a structure unit B represented by formula (2) and a cross-linking structural unit provided by a cross-linking agent,

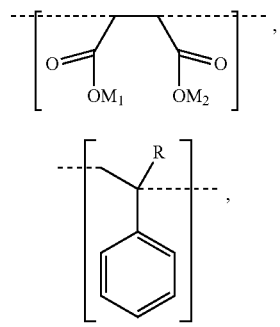

formula (1)

formula (2)

wherein, $M_1$ and $M_2$ are each independently selected from the group consisting of H, a metal cation and a linear, branched or cyclic $C_1$-$C_{20}$ saturated alkyl group, and R is H or methyl.

In one embodiment, $M_1$ and $M_2$ are each independently selected from the group consisting of H and a metal cation. Such microspheric ionomers are also referred to as maleic acid ionomer microspheres.

In another embodiment, $M_1$ and $M_2$ are each independently selected from the group consisting of a metal cation and a linear, branched or cyclic $C_1$-$C_{20}$ saturated alkyl group, and alternatively, may also be selected from H. Such microspheric ionomers contain ester groups, and are also referred to as maleic acid ester ionomer microspheres.

The linear, branched or cyclic $C_1$-$C_{20}$ saturated alkyl groups described herein are, for example, saturated alkyl groups of $C_1$, $C_2$, $C_4$, $C_6$, $C_8$, $C_{10}$, $C_{12}$, $C_{15}$, $C_{20}$ or any value between them, such as, methyl, ethyl, n-propyl, isopropyl, tert-butyl, n-butyl, isobutyl, n-pentyl, n-hexyl, n-heptyl, n-octyl, 2-methylbutyl, 3-methylbutyl, cyclohexyl, n-nonyl, isononyl, decyl, 2-propylheptyl, 2-ethylhexyl, dodecyl, tetradecyl, cetyl, octadecyl, etc. At least part of the structure units A in the ionomer comprise the incorporated metal cation.

The metal cation may be various common metal ions, for example, $Li^+$, $Na^+$, $K^+$, as well as the monovalent equivalent of $Ca^{2+}$, $Mg^{2+}$, $Ba^{2+}$ or $Zn^{2+}$.

The term "ionomer" as used herein is well known in the art and also referred to as "ionic polymer", and refers to polymer materials with a small number of ionic groups on the polymer chain.

In a preferred embodiment of the invention, the molar ratio between the structure unit A and the structure unit B is 100: (100-120), and more preferably 100: (100-105).

In another preferred embodiment of the invention, the molar ratio between the structure unit A and the cross-linking structural unit is 100: (1-40), and more preferably 100: (10-30).

In the invention, according to a preferred embodiment, the molar content of the metal cation in the ionomer comprises 10-120% (for example, 10%, 20%, 30%, 40%, 50%, 60%, 70%, 80%, 90%, 95%, 100%, 110%, 115%, 120%, or any value between the above numerical values) of the total molar amount of structure unit A in the ionomer. The cross-linking degree of the ionomer is preferably ≤65% (such as 65%, 70%, 75%, 80%, 85%, 90% or any value between the above numerical values). The ionomer is microsphere-shaped and has an average particle size of 150-2000 nm (such as 150 nm, 250 nm, 350 nm, 450 nm, 550 nm, 650 nm, 750 nm, 850 nm, 950 nm, 1050 nm, 1150 nm, 1250 nm, 1350 nm, 1450 nm, 1550 nm, 1650 nm, 1750 nm, 1850 nm, 2000 nm or any value between the above numerical values).

In the invention, the molar content of the metal cation is obtained by X-ray fluorescence spectrum analysis.

The cross-linking degree is a measure of gel content, and is measured by a solvent extraction method using tetrahydrofuran as the solvent.

The average particle size is characterized by number average particle size, and is measured with a scanning electron microscope.

In the invention, the cross-linking agent may be various common bi-functional or multi-functional vinyl monomers capable of radical polymerization. Preferably, the cross-linking agent is divinylbenzene and/or an acrylate cross-linking agent containing at least two acrylate groups, and the structural formula of the acrylate groups is: —O—C(O)—C(R')=$CH_2$, with R' being H or $C_1$-$C_4$ alkyl (such as methyl).

More preferably, the cross-linking agent is at least one selected from the group consisting of divinylbenzene, propylene glycol bis (meth) acrylate (such as 1,3-propylene glycol dimethacrylate, 1,2-propylene glycol dimethacrylate, 1,3-propylene glycol diacrylate, 1,2-propylene glycol diacrylate), ethylene glycol bis(meth) acrylate (ethylene glycol dimethacrylate, ethylene glycol diacrylate, diethylene glycol dimethacrylate, diethylene glycol diacrylate, triethylene glycol dimethacrylate, triethylene glycol diacrylate, tetraethylene glycol dimethacrylate, tetraethylene glycol diacrylate), trimethylolpropane triacrylate, trimethylolpropane trimethacrylate, bis(trimethylolpropane) tetraacrylate, bis(trimethylolpropane) tetramethacrylate, polyethylene glycol diacrylate, polyethylene glycol dimethacrylate, phthalic diethyleneglycol diacrylate, pentaerythritol tetraacrylate, dipentaerythritol pentaacrylate, dipentaerythritol hexaacrylate and ethoxylated polyfunctional acrylate.

Method for Preparation of the Ionomer

The ionomer according to the invention is prepared by the following method, the method comprising:

(1) contacting maleic anhydride, a monomer MB providing a structure unit B represented by formula (2) and a cross-linking agent, in an organic solvent, in the presence of an initiator, to react;

(2) ring-opening step: ring-opening the maleic anhydride unit in the product obtained in step (1).

The skilled in the art can understand that maleic anhydride is a substance that provides the structure unit A represented by formula (1). The monomer MB is a substance that provides the structure unit B represented by formula (2), and may be α-methyl styrene or styrene.

The reaction of step (1) can be performed by a method analogous to that described in CN101338008A.

In step (1) of the invention, there is no particular requirement on the amount of individual raw material used. Preferably, the amount of the monomer MB is 50-150 mol, more preferably 75-100 mol, relative to 100 mol of maleic anhydride.

Preferably, the amount of the cross-linking agent is 1-40 mol, more preferably 10-20 mol, and still more preferably 15-20 mol, relative to 100 mol of maleic anhydride.

Preferably, the amount of the organic solvent is 50-150 L, more preferably 75-100 L, relative to 100 mol of maleic anhydride.

Preferably, the amount of the initiator is 0.05-10 mol, more preferably 1-1.5 mol, relative to 100 mol of maleic anhydride.

In step (1) of the invention, the organic solvent may be various common solvents for solution polymerization reactions. For example, the organic solvent comprises an alkyl ester of organic acid, i.e., an alkyl ester of organic acid used alone, or a mixture of an alkyl ester of organic acid and an alkane, or a mixture of an alkyl ester of organic acid and an aromatic hydrocarbon. Among others, the alkyl ester of organic acid includes, but is not limited to, at least one selected from the group consisting of methyl formate, ethyl formate, propyl formate, butyl formate, isobutyl formate, pentyl formate, methyl acetate, ethyl acetate, propyl acetate, butyl acetate, isobutyl acetate, sec-butyl acetate, amyl acetate, isoamyl acetate, benzyl acetate, methyl propionate, ethyl propionate, butyl propionate, methyl butyrate, ethyl butyrate, butyl butyrate, isobutyl butyrate, isoamyl butyrate, isoamyl isovalerate, methyl benzoate, ethyl benzoate, propyl benzoate, butyl benzoate, isopentyl benzoate, methyl phenylacetate and ethyl phenylacetate. The alkane includes, but is not limited to, n-hexane and/or n-heptane. The aromatic hydrocarbon includes, but is not limited to, at least one selected from the group consisting of benzene, toluene and xylene.

In step (1) of the invention, the initiator may be a reagent commonly used in the art for initiating the polymerization reaction of maleic anhydride and α-methyl styrene (or styrene) and may be a thermal decomposition type initiator. Preferably, the initiator is at least one selected from the group consisting of dibenzoyl peroxide, dicumyl peroxide, di-tert-butyl peroxide, lauroyl peroxide, tert-butyl peroxy benzoate, diisopropyl peroxydicarbonate dicyclohexyl peroxydicarbonate, azobisisobutyronitrile and azobisisoheptonitrile.

The specific types of the cross-linking agent that can be used in step (1) of the invention are as described above.

In step (1) of the invention, there are no particular requirements on the conditions of the reaction, but preferably, the conditions of the reaction are such that the cross-linking degree of the ionomer is ≥65%. More preferably, in step (1), the conditions of the reaction include: an inert atmosphere, such as nitrogen or argon; a temperature of 50-90° C., further preferably 60-70° C.; and a time period of 3-15 h, further preferably 5-12 h.

For step (2), step (2) of the maleic acid ionomer microspheres and that of the maleic acid ester ionomer microspheres are performed under different conditions.

For maleic acid ionomer microspheres, step (2) can be carried out by reacting the product obtained in step (1) with a base in the presence of water for salinization.

In step (2) of this technical solution, the use of the base makes the percent of the molar content of the metal cations in the ionomer based on the total molar amount of the structure units provided by maleic anhydride in the ionomer within a specific range, preferably within the range described above. The amount of the base may be conventionally selected, and preferably, the amount of the base is 10-200 mol (such as mol, 50 mol, 100 mol, 150 mol, 190 mol, 200 mol, or any value between the above numerical values), relative to 100 mol of maleic anhydride. The base is preferably used in the form of an aqueous solution, and the concentration of the aqueous solution of the base is preferably 1 to 30% by weight.

The base may be a basic substance conventionally used in the art, that is, a basic substance capable of providing a metal cation (as described above), as long as a part of the carboxyl hydrogens in the polymer obtained in the step (1) to be salinized is replaced by a metal. Preferably, the base is selected from metal hydroxides and/or metal acetates. The metal may be a monovalent metal or an equivalent of a divalent metal, such as a metal from Group IA, Group IIA and/or Group IIB of the Periodic Table of Elements (especially lithium, sodium, potassium, calcium, barium, zinc and/or magnesium). More preferably, the base is at least one selected from the group consisting of lithium hydroxide, sodium hydroxide, potassium hydroxide, calcium hydroxide, barium hydroxide, zinc hydroxide, magnesium hydroxide, lithium acetate, sodium acetate, potassium acetate, calcium acetate, barium acetate and zinc acetate.

In step (2) of this technical solution, the salinization may be performed under conventional conditions. For example, the salinization conditions include: a temperature of 20-100° C., preferably 30-100° C.; and a time period of 0.5-8 h, preferably 0.5-6 h.

In step (2) of this technical solution, the product obtained in step (1) (in the form of a suspension) can also be post-treated (separated, washed and dried) before being reacted with a base. The washing may be performed using a conventional washing solvent, for example, at least one selected from the group consisting of n-hexane, isohexane, cyclohexane, n-heptane, n-octane, isooctane, methanol, ethanol, n-propanol, isopropanol, diethyl ether, isopropyl ether and methyl tert-butyl ether. In this way, an ionomer-containing dispersion system is obtained after salinization, and by a further separation treatment of the dispersion system, an ionomer product can be obtained. For example, the separation treatment is performed as follows: centrifugal separation, water washing, organic solvent washing (which may use the washing solvent described above, i.e. at least one selected from the group consisting of n-hexane, isohexane, cyclohexane, n-heptane, n-octane, isooctane, methanol, ethanol, n-propanol, isopropanol, diethyl ether, isopropyl ether and methyl tert-butyl ether), centrifugal separation and drying (such as vacuum drying).

The inventors have found that the ionomer of the invention can also be effectively prepared by directly reacting the suspension obtained in step (1) with a base for salinization without performing the step of removing organic solvent. Therefore, according to an embodiment of the invention, in step (2), the product obtained in step (1) can be directly reacted with a base (one-pot method), so that after salinization, an ionomer-containing mixed system is obtained. The mixed system can be subjected to a further separation treatment to obtain the ionomer product. For example, the separation treatment is performed in the following manner: the mixed system stands still to separate into layers, the organic phase of the upper layer is recycled, and the heavy phase of the lower layer is subjected to centrifugal separation, water washing-centrifugal separation and drying (for example, vacuum drying) to obtain the ionomer. This preferred method adopts a one-pot process. Post-treatment of the product requires only once liquid-liquid separation, solid-liquid separation, washing and drying, which effectively shortens the time required for a single batch, simplifies the process, reduces unit equipment, and effectively reduces energy consumption. The process requires only one organic solvent as the reaction medium, and the solvent can be recycled only by separating into layers and drying operations. Further, no special water separation device is required, separating into layers can be achieved in the reactor, and the solvent can be recycled without the need for purification by distillation. Energy is saved and consumption is reduced, and the environmental pollution caused by the use of organic solvent can be effectively reduced.

For maleic acid ester ionomer microspheres, step (2) can be performed by mixing and reacting the product obtained in step (1) with a base and a saturated monohydric alcohol.

In step (2) of this technical solution, the use of the base makes the percent of the molar content of the metal cations in the ionomer based on the total molar amount of the structure units provided by maleic anhydride in the ionomer within a specific range, preferably within the range already described above. The amount of the base can be conventionally selected. Preferably, the amount of the base is 5-100 mol (such as 5 mol, mol, 20 mol, 50 mol, 80 mol, 100 mol, or any value between the above numerical values), relative to 100 mol of maleic anhydride.

In step (2) of this technical solution, the base may be a basic substance conventionally used in the art (a basic substance capable of providing a metal cation (as described above)). Preferably, the base is at least one selected from the group consisting of metal hydroxides, metal acetates and metal alkoxides (especially $C_1$-$C_{10}$ alkoxides). The metal may be a monovalent metal or an equivalent of a divalent metal, such as a metal from Group IA, Group IIA and/or Group IIB of the Periodic Table of Elements (especially lithium, sodium, potassium, calcium, barium, zinc and/or magnesium). More preferably, the base is at least one selected from the group consisting of lithium hydroxide, sodium hydroxide, potassium hydroxide, calcium hydroxide, barium hydroxide, zinc hydroxide, magnesium hydroxide, lithium acetate, sodium acetate, potassium acetate, calcium acetate, barium acetate, zinc acetate, sodium methoxide, sodium ethoxide, sodium propoxide, sodium isopropoxide, sodium tert-butoxide, sodium tert-pentoxide, sodium isooctoxide, potassium methoxide, lithium methoxide, zinc methoxide, magnesium methoxide, calcium methoxide, potassium ethoxide, barium ethoxide, calcium ethoxide, lithium ethoxide and potassium t-butoxide.

In step (2) of this technical solution, the use of the saturated monohydric alcohol introduces an ester group to the ionomer. There is no particular requirement on the amount of the saturated monohydric alcohol, but the amount of the saturated monohydric alcohol is preferably 100-20000 mol, relative to 100 mol of maleic anhydride.

The saturated monohydric alcohol may be a saturated monohydric alcohol conventionally used in the art, as long as it can undergo an esterification reaction with the polymer obtained in step (1). It may be a linear alkanol, a branched alkanol or a cyclic alkanol. Preferably, the saturated monohydric alcohol is a $C_1$-$C_{20}$ (such as $C_1$, $C_2$, $C_4$, $C_6$, $C_8$, $C_{10}$, $C_{12}$, $C_{15}$, $C_{20}$, or any value there between) saturated monohydric alcohol. More preferably, the saturated monohydric alcohol is at least one selected from the group consisting of methanol, ethanol, propanol, isopropanol, butanol, isobutanol, tert-butanol, pentanol, 2-methylbutanol, 3-methylbutanol, hexanol, cyclohexanol, heptanol, octanol, nonanol, isononanol, decanol, 2-propylheptanol, 2-ethylhexanol, dodecanol, tetradecanol, cetyl alcohol and stearyl alcohol.

In step (2) of this technical solution, the reaction may be performed under conventional conditions. For example, the conditions of the reaction include: a temperature of 20-150° C., preferably 30-100° C.; a time period of 0.5-8 h, preferably 0.5-6 h.

In the invention, an ionomer can be obtained from the product obtained in step (2) via a simple solid-liquid separation step, without the need to introduce other reagents (or solvents). The liquid phase obtained by solid-liquid separation can be reused in step (1). The manner of solid-liquid separation may be filtration, centrifugation and other solid-liquid separation methods. The obtained solid phase can be further dried to obtain an ionomer product.

Figure 8:
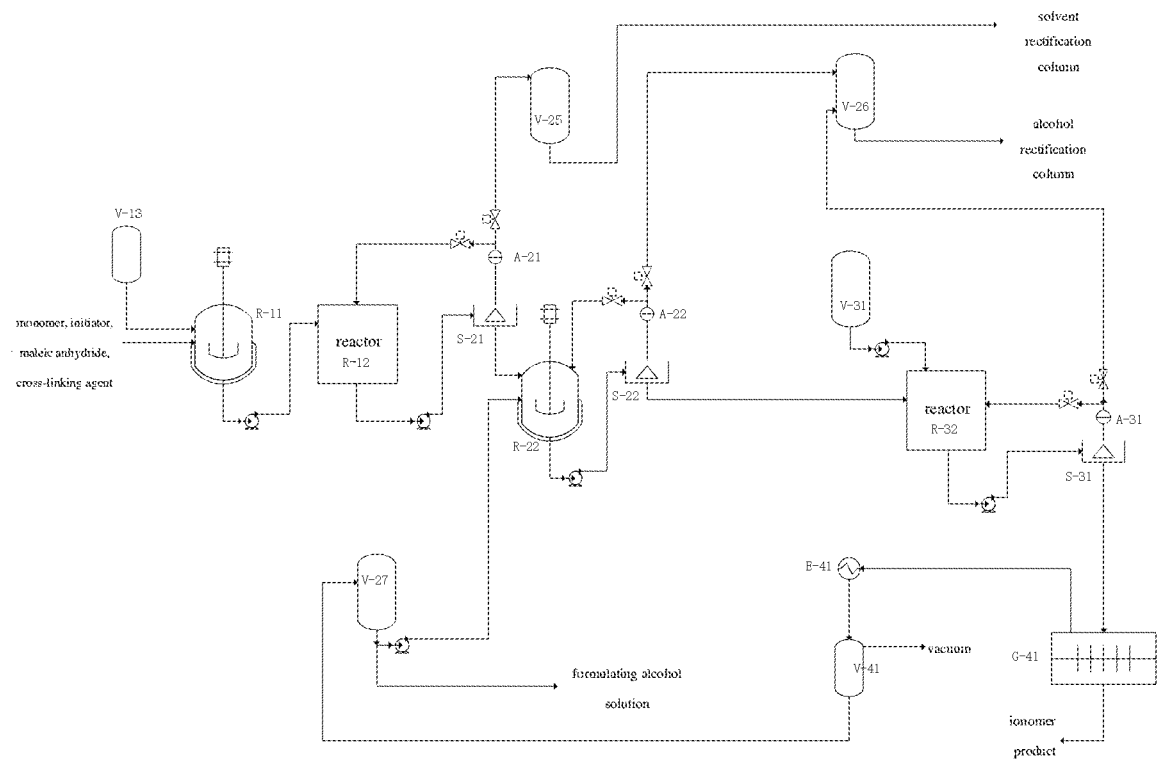
FIG. 8 is a schematic diagram I of the system for preparing maleic acid ester ionomer microspheres provided by the invention.

System and Method for the Continuous Preparation of Cross-Linked Maleic Acid Ester Ionomer Microspheres Another aspect of the invention provides a system for preparing cross-linked maleic acid ester ionomer microspheres. As shown in FIG. 8, the system comprises:

a copolymerization unit, a washing unit, an ionomer-forming reaction unit, a drying unit, and a solvent recovery unit that are communicated sequentially, wherein:

the copolymerization unit is used for a copolymerization reaction of comonomers, and for continuously subjecting the obtained polymer mother liquid containing maleic anhydride-based copolymer microspheres to a first separation to obtain a separated solid-containing phase and a separation liquid-I;

the washing unit is used for subjecting the separated solid-containing phase to at least one alcohol washing and a continuous second separation to obtain a copolymer slag phase and a washing clear liquid;

the ionomer-forming reaction unit is used for reacting the copolymer slag phase, and for continuously subjecting the prepared ionomer reaction liquid to a third separation, to obtain a centrifuged slag phase containing ionomer microspheres, and a separation liquid-II;

the drying unit is used for drying the centrifuged slag phase to obtain the cross-linked maleic acid ester ionomer microspheres;

the solvent recovery unit is used for removing impurities from the separation liquid-I, separation liquid-II and washing clear liquid, and returning the recovered solvent and recovered alcohol obtained by separation to the copolymerization unit and the washing unit, respectively; and this system is used to achieve continuous production of the cross-linked maleic acid ester ionomer microspheres.

According to this aspect of the invention, preferably, the copolymerization unit comprises: a reaction solvent storage tank V-13, a reaction liquid mixing vessel R-11, a copolymerization reactor R-12, a first disc centrifuge S-21, a first online turbidimeter A-21 and a separation liquid storage tank V-25; wherein, the reaction solvent storage tank V-13 is used to store the reaction solvent; the reaction liquid mixing vessel R-11 is used to mix the reaction solvent and the reaction raw materials into a reaction liquid; the copolymerization reactor R-12 is used to continuously perform copolymerization reaction of the reaction liquid; the polymer mother liquid obtained continuously flows into the first disc centrifuge S-21 for the continuous first separation, the obtained separation liquid passes through the first online turbidimeter A-21 and then is introduced into the copolymerization reactor R-12 or the separation liquid storage tank V-25.

In this aspect of the invention, the copolymerization reactor may be selected from a tubular reactor, a baffle reactor, or two stirred tank reactors in parallel.

According to this aspect of the invention, the first online turbidimeter A-21 is used to monitor the turbidity of the separation liquid-I obtained by separation by the first disc centrifuge S-21 to control the flow direction of the separation liquid-I. Preferably, a valve is respectively provided between the first online turbidimeter A-21 and the copolymerization reactor R-12, and between the first online turbidimeter A-21 and the separation liquid storage tank V-25, to introduce the separation liquid-I to the separation liquid storage tank V-25 when the turbidity of the separation liquid-I reaches the standard, and to introduce the separation liquid-I to the copolymerization reactor R-12 when the turbidity of the separation liquid-I does not reach the standard. Reaching the standard means that the turbidity of the separation liquid-I is lower than a preset value, for example, 0.1% by weight (the corresponding turbidity value of a turbid liquid formed by dispersing 0.1 g of polymer microspheres in 100 g of a solvent).

In the context of the invention, turbidity refers to the macroscopically-appearing turbid degree of a mixture due to the absorption, scattering or refraction of light by suspended particles in a homogeneously mixed mixture, and its value is measured using a turbidimeter. The turbidity value is related to the property and concentration of the particles. Therefore, for particles of the same kind, the turbidity value can be used as an index of particle concentration, and here is characterized by the particle concentration (the mass in g of the particles in 100 g of the solvent, in % by weight).

In the system provided by the invention, the high concentration reaction liquid discharged from the copolymerization reactor R-12 can avoid the manually-operated separation process in the prior art. The combined use of the first disc centrifuge S-21 and the first online turbidimeter A-21 arranged between the copolymerization reactor R-12 and the washing vessel R-22 can achieve the continuous first separation of the reaction liquid, reduce the exposure of the reaction liquid, and avoid air exposure operation.

In this context, the high concentration is relative to the following: existing disc centrifuge is generally used for the separation of low concentration turbid liquid with a solids content <5% by weight.

According to this aspect of the invention, the washing unit comprises: an alcohol storage tank V-27, a clear liquid storage tank V-26 and at least one set of washing devices, each set of the washing devices comprising: a washing vessel R-22, a second disc centrifuge S-22 and a second online turbidimeter A-22; wherein, alcohol storage tank V-27 is used to store alcohol solvent; washing vessel R-22 is used for continuous alcohol washing of the separated solid-containing phase with the alcohol solvent, to obtain a dispersion slurry; the dispersion slurry is continuously introduced into the second disc centrifuge S-22 for the continuous second separation, and the obtained washing clear liquid is passed through the second online turbidimeter A-22 and then introduced into the washing vessel R-22 or the clear liquid storage tank V-26.

According to this aspect of the invention, a valve is respectively provided between the second online turbidimeter A-22 and the washing vessel R-22, and between the second online turbidimeter A-22 and the clear liquid storage tank V-26, to introduce the washing clear liquid to the clear liquid storage tank V-26 when the turbidity of the washing clear liquid reaches the standard, and to introduce the washing clear liquid to the washing vessel R-22 when the turbidity of the washing clear liquid does not reach the standard.

In this aspect of the invention, the washing unit may comprise a plurality of sets of the washing devices, for example, the centrifuged slag phase obtained by separation by the second disc centrifuge S-22 in the previous set is continuously fed to the next set of washing devices for alcohol washing with an alcohol solvent, and then the same continuous second separation is performed as described above, the final copolymer slag phase that meets the alcohol washing effect enters into the drying unit of the system provided by the invention.

In this aspect of the invention, the high concentration dispersion slurry discharged from the washing vessel R-22 can avoid the manually-operated separation process in the prior art. The combined use of the second disc centrifuge S-22 and the second online turbidimeter A-22 arranged between the washing vessel R-22 and the ionomer reactor R-32 can achieve continuously subjecting the dispersion slurry to the continuous second separation, reduce the exposure of the dispersion slurry, and avoid air exposure operation.

According to this aspect of the invention, the ionomer-forming reaction unit comprises: an alkali liquid tank V-31, an ionomer reactor R-32, a third disc centrifuge S-31 and a third online turbidimeter A-31; wherein, alkali liquid tank V-31 is used to store an alcohol solution of a base to provide it to the reaction; ionomer reactor R-32 is used to carry out the reaction of the copolymer slag phase with an alcohol solution of a base; the obtained ionomer reaction liquid continuously flows into the third disc centrifuge S-31 for a continuous third separation, and the obtained separation liquid-II passes through the third online turbidimeter A-31 and then is introduced into the ionomer reactor R-32 or the clear liquid storage tank V-26.

In this aspect of the invention, the ionomer reactor may be selected from a tubular reactor, a baffle reactor or a stirred tank reactor.

According to this aspect of the invention, a valve is provided between the third online turbidimeter A-31 and the ionomer reactor R-32, and between the third online turbidimeter A-31 and the clear liquid storage tank V-26, respectively, to introduce the separation liquid-II to the clear liquid storage tank V-26 when the turbidity of the separation liquid-II reaches the standard, and to introduce the separation liquid-II to the ionomer reactor R-32 when the turbidity of the separation liquid-II does not reach the standard. Reaching the standard means that the turbidity of the separation liquid-II is lower than a preset value, such as 0.1% by weight.

In this aspect of the invention, the high concentration ionomer reaction liquid discharged from the ionomer reactor R-32 can avoid the manually-operated separation process in the prior art. The combined use of the third disc centrifuge S-31 and the third online turbidimeter A-31 arranged between the ionomer reactor R-32 and the dryer G-41 can achieve continuous third separation of the ionomer reaction liquid, reduce the exposure of the ionomer reaction liquid and avoid air exposure operation.

According to this aspect of the invention, the drying unit comprises: a dryer G-41, a condenser E-41 and a dried condensate tank V-41; wherein the dryer G-41 is used to dry the centrifuged slag phase to obtain the cross-linked maleic acid ester ionomer microspheres; the condenser E-41 is in communication with the dried condensate tank V-41, and is used to condense the gaseous solvent discharged from the dryer G-41 into a liquid, which is introduced into the dried condensate tank V-41; the dried condensate tank V-41 is in communication with an alcohol storage tank V-27.

In this aspect of the invention, the dryer G-41 may be, for example, a microwave dryer, a microwave vacuum dryer, and a rake vacuum dryer.

To promote drying, the dried condensate tank V-41 can also be connected to a vacuum device.

Figure 9:
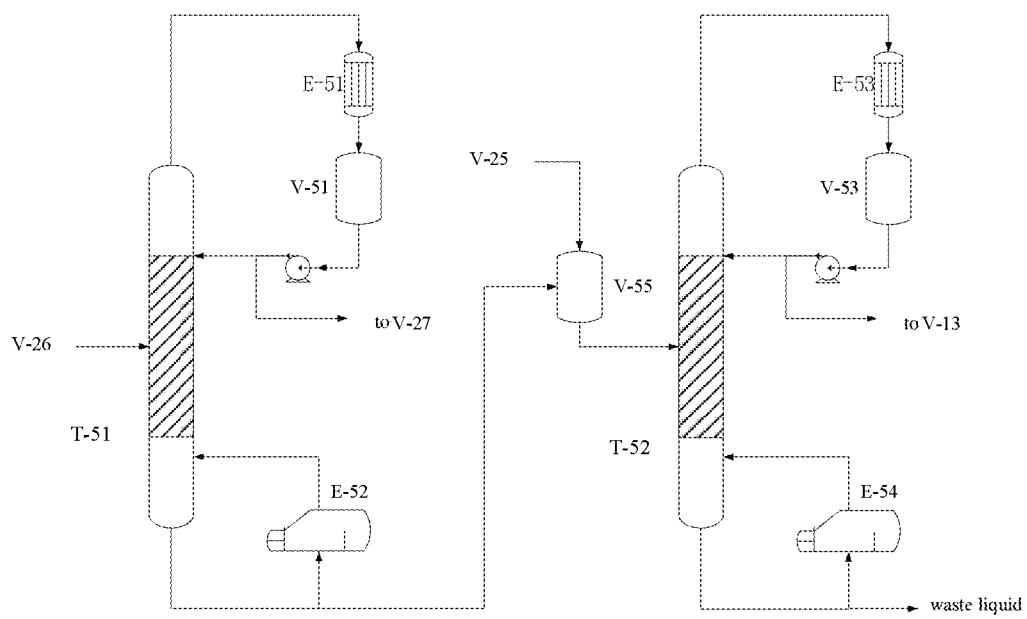
FIG. 9 is a schematic diagram II of the system for preparing maleic acid ester ionomer microspheres provided by the invention.

According to this aspect of the invention, as shown in FIG. 9, the solvent recovery unit comprises: an alcohol solvent recovery device and a reaction solvent recovery device; wherein the alcohol solvent recovery device is in communication with the clear liquid storage tank V-26, the alcohol storage tank V-27 and the reaction solvent recovery device, and is used to recover the alcohol solvent in the washing clear liquid from the clear liquid storage tank V-26 and return it to the alcohol storage tank V-27, while the remaining residual liquid of the washing clear liquid is introduced into the reaction solvent recovery device; the reaction solvent recovery device is in communication with the separation liquid storage tank V-25 and the reaction solvent storage tank V-13, and is used to recover the separation liquid from the separation liquid storage tank V-25 and the reaction solvent in the residual liquid and to return them to the reaction solvent storage tank V-13. The separation liquid in the separation liquid storage tank V-25 may comprise the separation liquid-I from the copolymerization unit and the separation liquid-II from the ionomer-forming reaction unit.

According to this aspect of the invention, the alcohol solvent recovery device comprises: an alcohol rectification column T-51, an alcohol heat exchanger E-51, an alcohol condensate tank V-51 and a residual liquid reboiler E-52; wherein the alcohol rectification column T-51 is used to distill the clear liquid from the clear liquid storage tank V-26, and the alcohol vapor discharged from the top of the alcohol rectification column T-51 passes through the alcohol heat exchanger E-51 and the alcohol condensate tank V-51 successively to obtain recovered alcohol; one part of the recovered alcohol is returned to the alcohol rectification column T-51, and the other part of the recovered alcohol is returned to the alcohol storage tank V-27 for reuse in the washing unit; residual liquid is discharged from the bottom of the alcohol rectification column T-51, one part of the residual liquid passes through the residual liquid reboiler E-52 and is then returned to the alcohol rectification column T-51, and the other part of the residual liquid is introduced into the reaction solvent recovery device.

In this aspect of the invention, the alcohol rectification column T-51 may be a normal pressure or slightly positive pressure column for refining the alcohol in the clear liquid. A metering pump can also be arranged between the alcohol condensate tank V-51 and the alcohol rectification column T-51.

According to this aspect of the invention, the reaction solvent recovery device comprises: a feed tank V-55, a reaction solvent rectification column T-52, a solvent heat exchanger E-53, a solvent condensate tank V-53 and a waste liquid reboiler E-54; wherein the feed tank V-55 is in communication with the bottom of the alcohol rectification column T-51 and the separation liquid storage tank V-25, and is used to mix the residual liquid and the separation liquid from the separation liquid storage tank V-25 as a feed; the reaction solvent rectification column T-52 is used to fractionate the feed, the solvent vapor discharged from the top of the reaction solvent rectification column T-52 passes through the solvent heat exchanger E-53 and the solvent condensate tank V-53 successively to obtain a recovered solvent; one part of the recovered solvent is returned to the reaction solvent rectification column T-52, and the other part of the recovered solvent is returned to the reaction solvent storage tank V-13 for reuse in the copolymerization unit; waste liquid is discharged from the bottom of the reaction solvent rectification column T-52, one part of the waste liquid passes through the waste liquid reboiler E-54 and then is returned to the reaction solvent rectification column T-52, and the other part of the waste liquid is discharged.

In this aspect of the invention, the reaction solvent rectification column T-52 is used to refine the reaction solvent in the feed from the feed tank V-55. A metering pump can also be arranged between the solvent condensate tank V-53 and the reaction solvent rectification column T-52.

In this aspect of the invention, the reaction solvent recovery device may further be provided with a communicated vacuum system, which can improve the efficiency of the reaction solvent rectification column T-52 and reduce energy consumption.

In this aspect of the invention, the alcohol rectification column T-51 may be provided with a discharge pump and a regulating valve between the top outlet of the column and the alcohol heat exchanger E-51, to control the discharge and reflux ratio. The reaction solvent rectification column T-52 can be provided with a discharge pump and a regulating valve between the top outlet of the column and the solvent heat exchanger E-53, to control the discharge and reflux ratio.

In this aspect of the invention, the above-mentioned various devices, such as tanks, columns, reactors, condensers, heat exchangers, reboilers, vessels, centrifuges, etc., can be provided with a material inlet and/or outlet respectively according to need. The material inlet is used to receive the introduced material, and the material outlet is used to discharge the material. One or more material inlets and outlets can be arranged according to actual need.

In this aspect of the invention, the reaction liquid mixing vessel R-11, the ionomer reactor R-32, the washing vessel R-22 and the copolymerization reactor R-12 may further be provided inside with a stirring mechanism. The stirring mechanism is used to stir the materials in the tank or reactor when needed, so that the mass transfer is more sufficient.

In addition, the reaction liquid mixing vessel R-11, the ionomer reactor R-32, the washing vessel R-22 and the copolymerization reactor R-12 can further be provided with a jacket, and the temperature adjustment is achieved by circulating water.

In this aspect of the invention, the system may further comprise:

a metering pump arranged between the reaction liquid mixing vessel R-11 and the copolymerization reactor R-12, between the copolymerization reactor R-12 and the first disc centrifuge S-21, between the alkali liquid tank V-31 and the ionomer reactor R-32, between the ionomer reactor R-32 and the third disc centrifuge S-31, between the alcohol storage tank V-27 and the washing vessel R-22, as well as between the washing vessel R-22 and the second disc centrifuge S-22.

In this aspect of the invention, the first disc centrifuge, the second disc centrifuge and the third disc centrifuge comprised in the above system preferably adopt a separation factor of more than 9,000, preferably 9,000 to 60,000. 9,000, 10,000, 20,000, 30,000, 40,000, 50,000 or 60,000 and the value within the range constituted by any two of the above numerical values can be selected. The disc centrifuge within this defined range can better meet the conditions of the centrifugal separation of the microsphere-containing materials under high concentration condition achieved by the system provided by the invention, achieve the continuous operation of the system of the invention, and reduce the risk of air exposure operation.

In the context of the invention, separation factor refers to the ratio of the centrifugal force in the centrifugal force field to the gravity of the suspension or emulsion in the centrifuge, i.e., the ratio of the centrifugal acceleration to the gravity acceleration. Separation factor is represented by Fr: in the formula, R is the radius (meter) of the position of the materials to be separated in the rotary drum; $\omega$ is the rotational angular velocity (rad/s) of the rotary drum; g is the gravity acceleration (9.81 m/s$^2$); n is the rotating speed of the rotary drum (r/min); and m is the mass (kg) of the materials in the rotary drum. Separation factor is a main indicator for the measurement of performance of a centrifuge. The larger the Fr is, the greater the driving force for centrifugal separation is and the better the separation performance of the centrifuge is.

$$Fr = \frac{mR\omega^2}{mg} = \frac{R\omega^2}{g} = 1.12 \times 10^{-3} Rn^2$$

Figure 10:
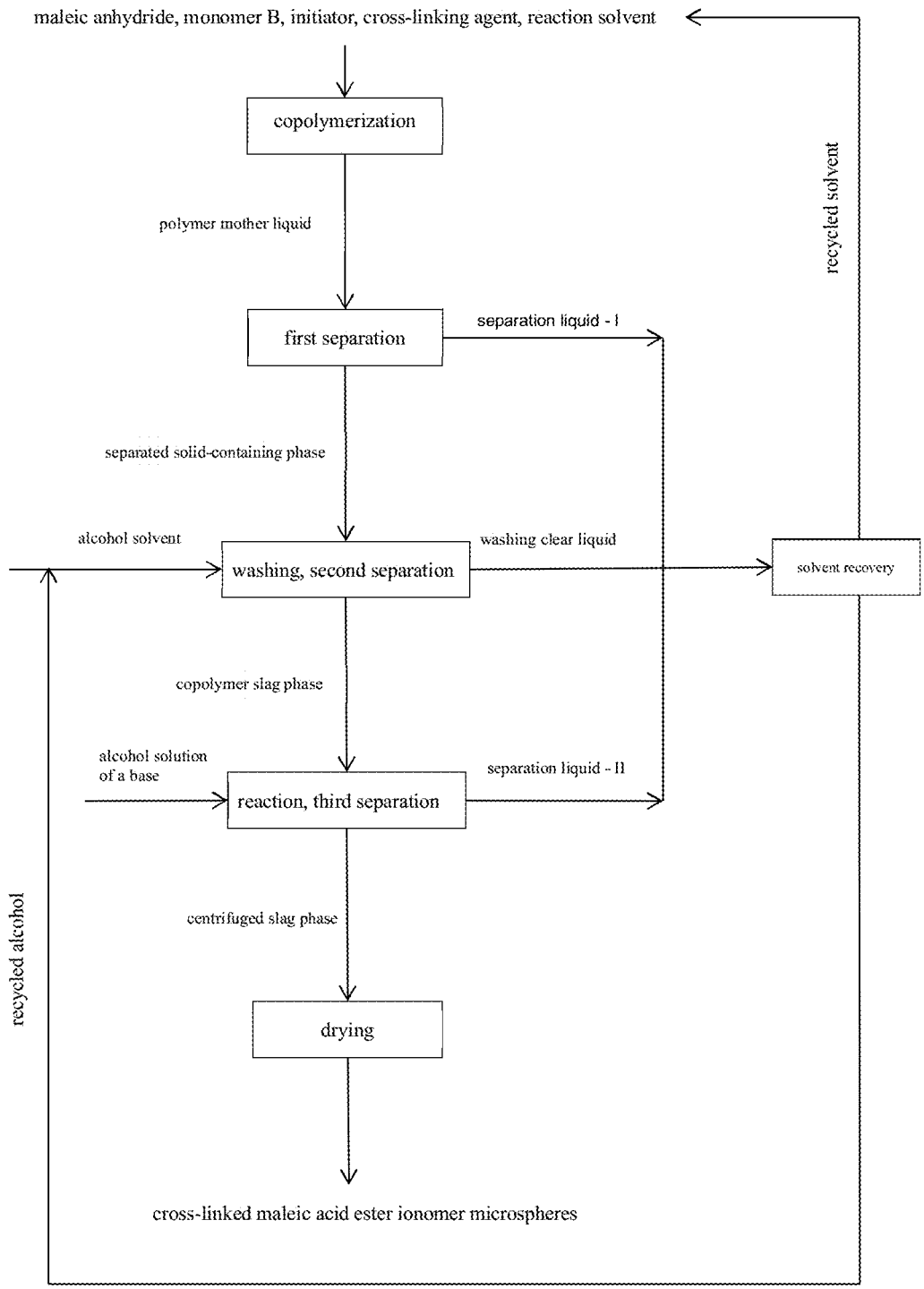
FIG. 10 is a schematic flowchart of the method for preparing maleic acid ester ionomer microspheres provided by the invention.

Accordingly, the invention provides a method for preparing cross-linked maleic acid ester ionomer microspheres, which is carried out in the above system of the invention, and as shown in FIG. 10, comprises:
(1) subjecting maleic anhydride and a monomer MB represented by formula (I) to copolymerization reaction in the presence of an initiator, a cross-linking agent and a reaction solvent in the copolymerization unit of the system, to obtain a polymer mother liquid containing maleic anhydride-based copolymer microspheres,

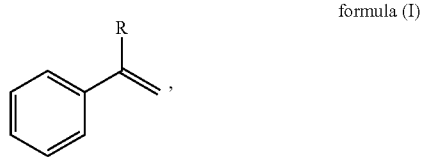

formula (I)

R being H or methyl;
(2) subjecting the polymer mother liquid to a continuous first separation to obtain a separated solid-containing phase and a separation liquid-I;
(3) introducing the separated solid-containing phase into the washing unit of the system, performing at least one alcohol washing and a continuous second separation, to obtain a copolymer slag phase and a washing clear liquid;
(4) reacting the copolymer slag phase with an alcohol solution of a base, and continuously subjecting the obtained product to a third separation, to obtain a centrifuged slag phase containing ionomer microspheres and a separation liquid-I;
(5) sending the centrifuged slag phase to the drying unit of the system for drying, to obtain cross-linked maleic acid ester ionomer microspheres; and
(6) introducing the separation liquid-I, separation liquid-II and washing clear liquid to the solvent recovery unit of the system, and returning the recovered solvent and recovered alcohol obtained by recovery to steps (1) and (3), respectively.

The specific conditions that can be adopted in step (1) are as described above for the method for preparing the ionomer microspheres of the invention.

Step (3) is used for washing the separated solid-containing phase, and can remove the residue of the copolymerization reaction in step (1). Preferably, the alcohol washing uses, in total, 100-250 L of an alcohol solvent, more preferably 150-200 L, relative to 100 mol of maleic anhydride. Preferably, the alcohol solvent is selected from methanol or ethanol.

The kind and amount of the base used in step (4) are as described above for the method for preparing the maleic acid ester ionomer microspheres.

The alcohol used in the alcohol solution of the base may be a saturated monohydric alcohol, preferably methanol or ethanol. Preferably, the amount of alcohol in the alcohol solution of the base is 100-20,000 mol, relative to 100 mol of maleic anhydride.

Preferably, in step (4), the copolymer slag phase concerned is reacted with the alcohol solution of the base to obtain an ionomer, wherein the reaction temperature is 20-80° C., preferably 30-70° C., and the reaction time is 0.5-8 h, preferably 0.5-3 h.

According to this aspect of the invention, the steps (2), (3) and (4) all involve separation of microspheres from the obtained microsphere-containing materials. For example, in step (2), the polymer mother liquid containing maleic anhydride-based copolymer microspheres is subjected to a first separation; in step (3), the separated solid-containing phase containing copolymer microspheres after alcohol washing is subjected to a continuous second separation; and in step (4), the product containing the ionomer microspheres is subjected to a third separation. These microsphere-containing materials are subjected to solid-liquid separation under high concentration condition to obtain highly pure, ultra-fine microspheres. Preferably, the separation factor of the first separation in step (2) is greater than 9,000, preferably 9,000-60,000; the separation factor of the second separation in step (3) is greater than 9,000, preferably 9,000-60,000; and the separation factor of the third separation in step (4) is greater than 9,000, preferably 9,000-60,000. Within the above defined range of the separation factor, the industrialized continuous performing of the above various separations in steps (2)-(4) in the invention under the condition of the high concentration microsphere content can be achieved.

In step (5) of this aspect of the invention, the drying temperature may be 50-150° C., and the drying pressure may be 10-1013 mbar, preferably 10-200 mbar, to further remove the reaction solvent and/or alcohol solvent entrained in the slag phase.

In this aspect of the invention, step (6) is used to recover the solvent and the alcohol, and is performed in the solvent recovery unit of the system provided by the invention. The operation and control conditions for each partial device in the solvent recovery unit shall be sufficient for the recovery of the reaction solvent and the alcohol in the separation liquid-I, separation liquid-II and washing clear liquid.

In this aspect of the invention, the object of the invention can be better achieved under the above-defined conditions, continuous preparation of a maleic acid ester ionomer having cross-linked and microspheric structures is achieved, the air exposure operation of the solvent is avoided and frequent start and stop operations of the centrifuge is avoided.

Figure 13:
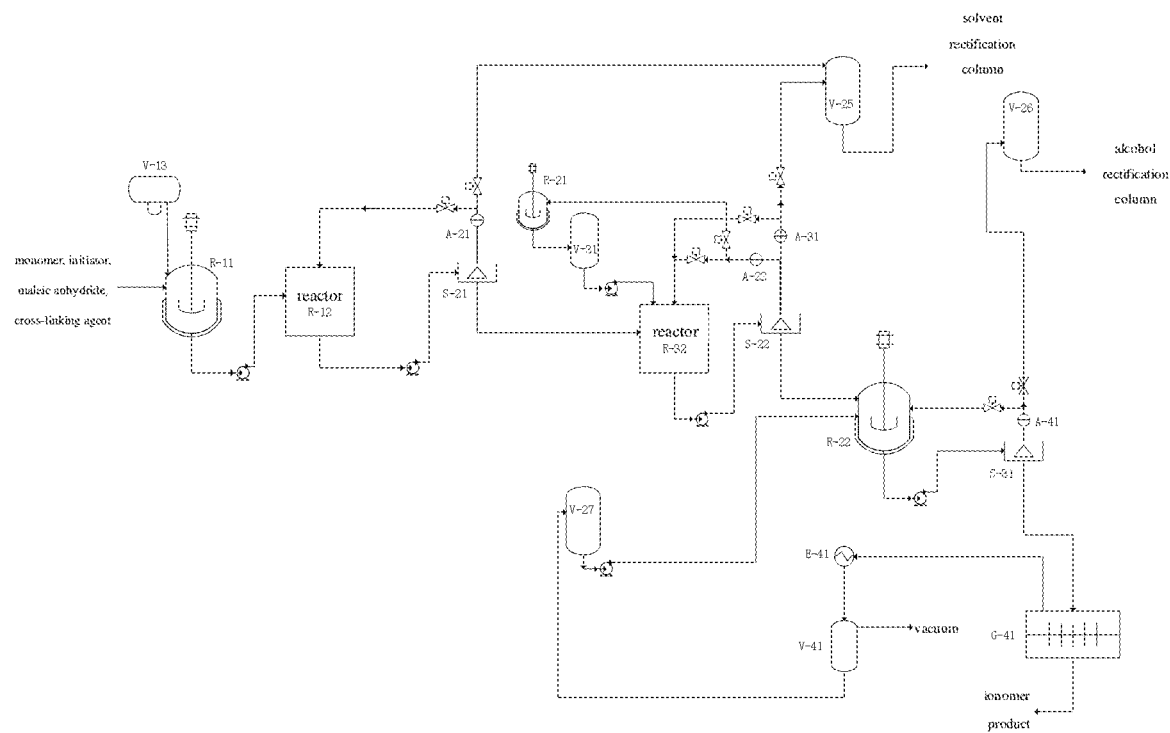
FIG. 13 is a schematic diagram I of the system for preparing maleic acid ionomer microspheres provided by the invention.

System and Method for the Continuous Preparation of Cross-Linked Maleic Acid Ionomer Microspheres Another aspect of the invention provides a system for preparing cross-linked maleic acid ionomer microspheres. As shown in FIG. 13, the system comprises:
a copolymerization unit, an ionomer-forming reaction unit, a washing unit, a drying unit, and a solvent recovery unit that are communicated sequentially, wherein:
the copolymerization unit is used for a copolymerization reaction of comonomers, and for continuously subjecting the obtained polymer mother liquid containing the maleic anhydride-based copolymer microspheres to a first separation to obtain a separated solid-containing phase and a separation liquid-I;
the ionomer-forming reaction unit is used for reacting the separated solid-containing phase, and for continuously subjecting the prepared product to a second separation to obtain a centrifuged slag phase containing ionomer microspheres, an aqueous phase and a separation liquid-II;

the washing unit is used for subjecting the centrifuged slag phase to at least one alcohol washing and a continuous third separation to obtain an ionomer slag phase and a washing clear liquid;

the drying unit is used for drying the ionomer slag phase to obtain the cross-linked maleic acid ionomer microspheres;

the solvent recovery unit is used for removing impurities from the separation liquid-I, separation liquid-II and washing clear liquid, and returning the recovered solvent and recovered alcohol obtained by separation to the copolymerization unit and the washing unit, respectively; and this system is used to achieve continuous production of the cross-linked maleic acid ionomer microspheres.

According to this aspect of the invention, preferably, the copolymerization unit comprises: a reaction solvent storage tank V-13, a reaction liquid mixing vessel R-11, a copolymerization reactor R-12, a first disc centrifuge S-21, a first online turbidimeter A-21 and a separation liquid storage tank V-25; wherein, the reaction solvent storage tank V-13 is used to store the reaction solvent; the reaction liquid mixing vessel R-11 is used to mix the reaction solvent and the reaction raw materials into a reaction liquid; the copolymerization reactor R-12 is used to continuously perform the copolymerization reaction of the reaction liquid; the polymer mother liquid obtained continuously flows into the first disc centrifuge S-21 for the continuous first separation, the obtained separation liquid passes through the first online turbidimeter A-21 and then is introduced into the copolymerization reactor R-12 or the separation liquid storage tank V-25. In this aspect of the invention, the copolymerization reactor may be selected from a tubular reactor, a baffle reactor, or two stirred tank reactors in parallel.

According to this aspect of the invention, the first online turbidimeter A-21 is used to monitor the turbidity of the separation liquid-I obtained by separation by the first disc centrifuge S-21 to control the flow direction of the separation liquid-I. Preferably, a valve is respectively provided between the first online turbidimeter A-21 and the copolymerization reactor R-12, and between the first online turbidimeter A-21 and the separation liquid storage tank V-25, to introduce the separation liquid-I to the separation liquid storage tank V-25 when the turbidity of the separation liquid-I reaches the standard, and to introduce the separation liquid-I to the copolymerization reactor R-12 when the turbidity of the separation liquid-I does not reach the standard. Reaching the standard means that the turbidity of the separation liquid-I is lower than a preset value, for example, 0.1% by weight.

In this aspect of the invention, a water separator can be provided at the lower part of the reaction solvent storage tank V-13, for removing the small amount of water in the recovered solvent.

In this aspect of the invention, the high concentration reaction liquid discharged from the copolymerization reactor R-12 can avoid the manually-operated separation process in the prior art. The combined use of the first disc centrifuge S-21 and the first online turbidimeter A-21 arranged between the copolymerization reactor R-12 and the ionomer reactor R-32 can achieve the continuous first separation of the reaction liquid, reduce the exposure of the reaction liquid, and avoid air exposure operation.

According to this aspect of the invention, the ionomer-forming reaction unit comprises: an alkali dissolution vessel R-21, an alkali liquid tank V-31, an ionomer reactor R-32, a second disc centrifuge S-22, a second online turbidimeter A-22 and a third online turbidimeter A-31; wherein, the alkali dissolution vessel R-21 is used for dissolving a base in water to become an alkali liquid; the alkali liquid tank V-31 is used for storing the alkali liquid, to provide it to the reaction; the ionomer reactor R-32 is used for the reaction of the separated solid-containing phase with the alkali liquid; the obtained ionomer reaction liquid continuously flows into the second disc centrifuge S-22 for the continuous second separation, the obtained aqueous phase passes through the second online turbidimeter A-22, and the separation liquid-II passes through the third online turbidimeter A-31 and then is introduced into the ionomer reactor R-32, separation liquid storage tank V-25 or alkali dissolution vessel R-21.

In this aspect of the invention, the ionomer reactor may be selected from a tubular reactor, a baffle reactor or a stirred tank reactor.

According to this aspect of the invention, a valve is arranged between the second online turbidimeter A-22 and the ionomer reactor R-32, between the second online turbidimeter A-22 and the alkali dissolution vessel R-21, between the third online turbidimeter A-31 and the ionomer reactor R-32, and between the third online turbidimeter A-31 and the separation liquid storage tank V-25, respectively, to introduce the separation liquid-II to the separation liquid storage tank V-25 when the turbidity of the separation liquid-II reaches the standard, to introduce the aqueous phase to the alkali dissolution vessel R-21 when the turbidity of the aqueous phase reaches the standard, and to introduce the aqueous phase and the separation liquid-II to the ionomer reactor R-32 when they do not reach the standard. Reaching the standard means that the turbidity of the separation liquid-II is lower than a preset value, such as 0.1% by weight.

In this aspect of the invention, the high concentration ionomer reaction liquid discharged from the ionomer reactor R-32 can avoid the manually-operated separation process in the prior art. The combined use of the second disc centrifuge S-22, the second online turbidimeter A-22 and the third online turbidimeter A-31 arranged between the ionomer reactor R-32 and the washing vessel R-22 can achieve the continuous second separation of the ionomer reaction liquid, reduce the exposure of the ionomer reaction liquid and avoid air exposure operation.

According to this aspect of the invention, the washing unit comprises: an alcohol storage tank V-27, a clear liquid storage tank V-26 and at least one set of washing devices, each set of the washing devices comprising: a washing vessel R-22, a third disc centrifuge S-31 and a fourth online turbidimeter A-41; wherein, alcohol storage tank V-27 is used to store alcohol solvent; washing vessel R-22 is used to continuously subject the centrifuged slag phase to the alcohol washing with the alcohol solvent to obtain a dispersion slurry; the dispersion slurry is continuously introduced into the third disc centrifuge S-31 for a continuous third separation, and the obtained washing clear liquid passes through the fourth online turbidimeter A-41 and then is introduced into the washing vessel R-22 or clear liquid storage tank V-26.

According to this aspect of the invention, a valve is respectively provided between the fourth online turbidimeter A-41 and the washing vessel R-22, and between the fourth online turbidimeter A-41 and the clear liquid storage tank V-26, to introduce the washing clear liquid to the clear liquid storage tank V-26 when the turbidity of the washing clear liquid reaches the standard, and to introduce the washing clear liquid to the washing vessel R-22 when the turbidity of the washing clear liquid does not reach the standard.

In this aspect of the invention, the washing unit may comprise a plurality of sets of the washing devices, for example, the centrifuged slag phase obtained by separation by the third disc centrifuge S-31 in the previous set is continuously fed to the next set of washing device for alcohol washing with an alcohol solvent, and then the same continuous third separation is performed as described above, the final slag phase that meets the alcohol washing effect enters into the drying unit of the system provided by the invention.

In this aspect of the invention, the high concentration dispersion slurry discharged from the washing vessel R-22 can avoid the manually-operated separation process in the prior art. The combined use of the third disc centrifuge S-31 and the fourth online turbidimeter A-41 arranged between the washing vessel R-22 and the dryer G-41 can achieve continuously subjecting the dispersion slurry to the continuous third separation, reduce the exposure of the dispersion slurry, and avoid air exposure operation.

According to this aspect of the invention, the drying unit comprises: a dryer G-41, a condenser E-41 and a dried condensate tank V-41; wherein the dryer G-41 is used to dry the ionomer slag phase to obtain the cross-linked maleic acid ionomer microspheres; the condenser E-41 is in communication with the dried condensate tank V-41, and is used to condense the gaseous solvent discharged from the dryer G-41 into a liquid, which is introduced to the dried condensate tank V-41; and the dried condensate tank V-41 is in communication with the alcohol storage tank V-27.

In this aspect of the invention, the dryer G-41 may be, for example, a microwave dryer, a microwave vacuum dryer, and a rake vacuum dryer.

To promote drying, the dried condensate tank V-41 can also be in communication with a vacuum device.

Figure 14:
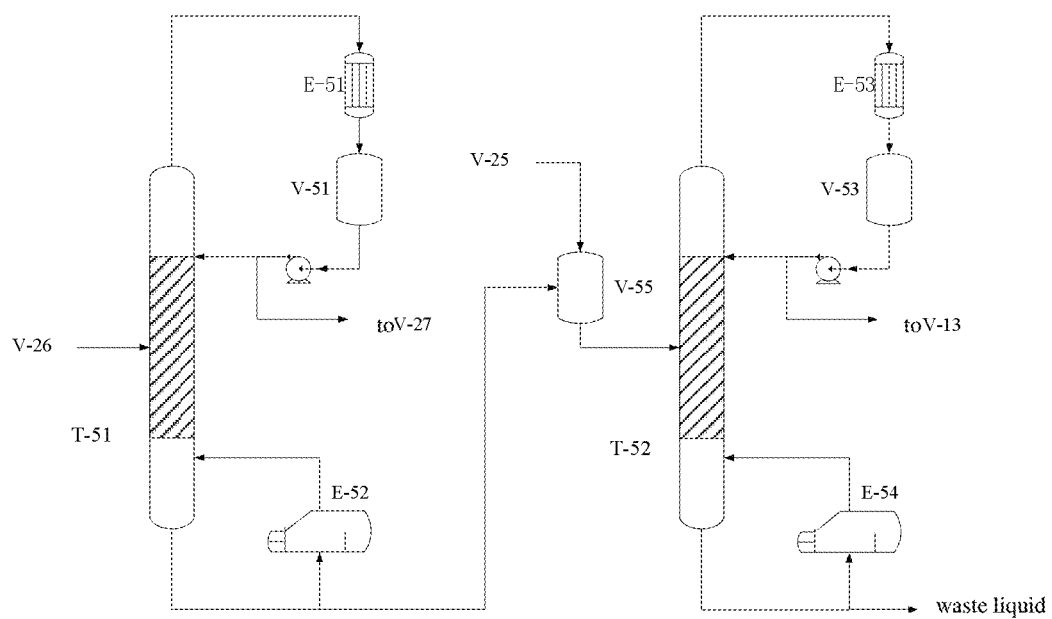
FIG. 14 is a schematic diagram II of the system for preparing maleic acid ionomer microspheres provided by the invention.

According to this aspect of the invention, as shown in FIG. 14, the solvent recovery unit comprises: an alcohol solvent recovery device and a reaction solvent recovery device; wherein the alcohol solvent recovery device is in communication with the clear liquid storage tank V-26, the alcohol storage tank V-27 and the reaction solvent recovery device, and is used to recover the alcohol solvent in the washing clear liquid from the clear liquid storage tank V-26 and return it to the alcohol storage tank V-27, while the remaining residual liquid of the washing clear liquid is introduced into the reaction solvent recovery device; the reaction solvent recovery device is in communication with the separation liquid storage tank V-25 and the reaction solvent storage tank V-13, and is used to recover the separation liquid from the separation liquid storage tank V-25 and the reaction solvent in the residual liquid, and to return them to the reaction solvent storage tank V-13. The separation liquid in the separation liquid storage tank V-25 may comprise the separation liquid-I from the copolymerization unit, and the separation liquid-II from the ionomer-forming reaction unit.

According to this aspect of the invention, the alcohol solvent recovery device comprises: an alcohol rectification column T-51, an alcohol heat exchanger E-51, an alcohol condensate tank V-51 and a residual liquid reboiler E-52; wherein the alcohol rectification column T-51 is used to distill the clear liquid from the clear liquid storage tank V-26, and the alcohol vapor discharged from the top of the alcohol rectification column T-51 passes through the alcohol heat exchanger E-51 and alcohol condensate tank V-51 successively to obtain recovered alcohol; one part of the recovered alcohol is returned to the alcohol rectification column T-51, and the other part of the recovered alcohol returns to the alcohol storage tank V-27 for reuse in the washing unit; a residual liquid is discharged from the bottom of the alcohol rectification column T-51, one part of the residual liquid passes through the residual liquid reboiler E-52 and then returns to the alcohol rectification column T-51, and the other part of the residual liquid is introduced into the reaction solvent recovery device.

In this aspect of the invention, the alcohol rectification column T-51 may be a normal pressure or slightly positive pressure column for refining the alcohol in the clear liquid. A metering pump can also be provided between the alcohol condensate tank V-51 and the alcohol rectification column T-51.

According to this aspect of the invention, the reaction solvent recovery device comprises: a feed tank V-55, a reaction solvent rectification column T-52, a solvent heat exchanger E-53, a solvent condensate tank V-53 and a waste liquid reboiler E-54; wherein the feed tank V-55 is in communication with the bottom of the alcohol rectification column T-51 and the separation liquid storage tank V-25, and is used to mix the residual liquid and the separation liquid from the separation liquid storage tank V-25 as a feed; the reaction solvent rectification column T-52 is used to fractionate the feed, and the solvent vapor discharged from the top of the reaction solvent rectification column T-52 passes through the solvent heat exchanger E-53 and the solvent condensate tank V-53 successively to obtain a recovered solvent; one part of the recovered solvent returns to the reaction solvent rectification column T-52, and the other part of the recovered solvent returns to the reaction solvent storage tank V-13 for reuse in the copolymerization unit; the waste liquid is discharged from the bottom of the reaction solvent rectification column T-52, one part of the waste liquid passes through the waste liquid reboiler E-54 and then returns to the reaction solvent rectification column T-52, and the other part of the waste liquid is discharged.

In this aspect of the invention, the reaction solvent rectification column T-52 is used to refine the reaction solvent in the feed from the feed tank V-55. A metering pump can also be provided between the solvent condensate tank V-53 and the reaction solvent rectification column T-52.

In this aspect of the invention, the reaction solvent recovery device may further be provided with a communicated vacuum system, which can improve the efficiency of the reaction solvent rectification column T-52 and reduce energy consumption.

In this aspect of the invention, the alcohol rectification column T-51 may be provided with a discharge pump and a regulating valve between the top outlet of the column and the alcohol heat exchanger E-51, to control the discharge and reflux ratio. The reaction solvent rectification column T-52 can be provided with a discharge pump and a regulating valve between the top outlet of the column and the solvent heat exchanger E-53, to control the discharge and reflux ratio.

In this aspect of the invention, the above various devices, such as, tanks, columns, reactors, condensers, heat exchangers, reboilers, vessels, centrifuges, etc., can be provided with a material inlet and/or outlet respectively according to need. The material inlet is used to receive the introduced materials, and the material outlet is used to discharge materials. One or more material inlets and outlets can be arranged according to actual need.

In this aspect of the invention, the reaction liquid mixing vessel R-11, the alkali dissolution vessel R-21, the ionomer reactor R-32, the washing vessel R-22 and the copolymerization reactor R-12 may further be provided inside with a stirring mechanism.

The stirring mechanism is used to stir the materials in the tank or reactor when needed, so that the mass transfer is more sufficient. In addition, the reaction liquid mixing vessel R-11, the alkali dissolution vessel R-21, the ionomer reactor R-32, the washing vessel R-22 and the copolymerization reactor R-12 can further be provided with a jacket, and the temperature adjustment is achieved by circulating water.

In this aspect of the invention, the system may further comprise:

a metering pump arranged between the reaction liquid mixing vessel R-11 and the copolymerization reactor R-12, between the copolymerization reactor R-12 and the first disc centrifuge S-21, between the alkali liquid tank V-31 and the ionomer reactor R-32, between the ionomer reactor R-32 and the second disc centrifuge S-22, between alcohol storage tank V-27 and the washing vessel R-22, and between the washing vessel R-22 and the third disc centrifuge S-31.

In this aspect of the invention, the first disc centrifuge, the second disc centrifuge and the third disc centrifuge comprised in the above system preferably adopt a separation factor of greater than 9,000, preferably 9,000 to 60,000. The disc centrifuge within this defined range can better achieve the centrifugal separation of the microsphere-containing materials by the system provided by the invention under high concentration condition, achieve the continuous operation of the system of the invention, and reduce the risk of air exposure operation.

Figure 15:
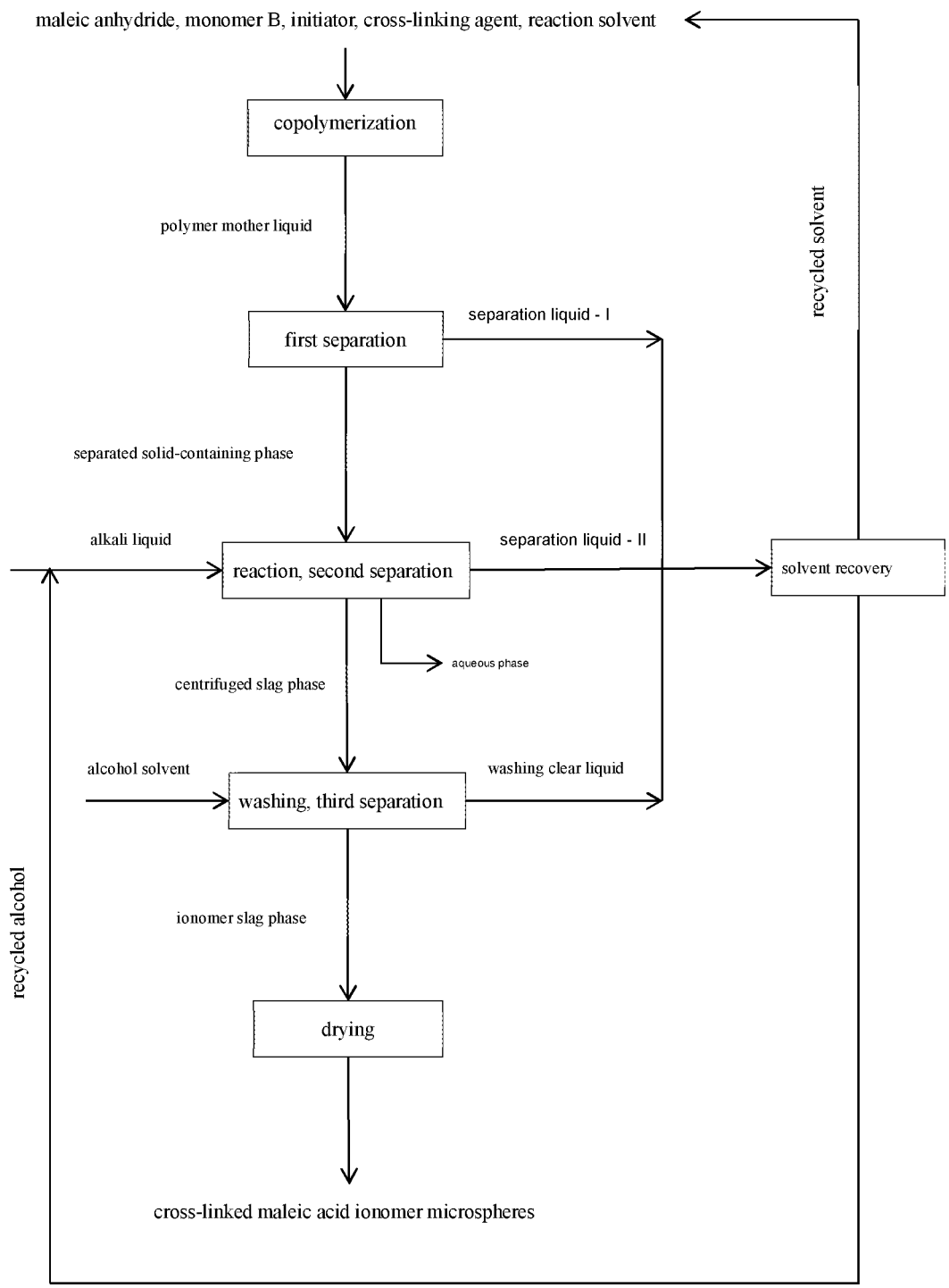
FIG. 15 is a schematic flowchart of the method for preparing maleic acid ionomer microspheres provided by the invention.

Accordingly, the invention provides a method for preparing cross-linked maleic acid ionomer microspheres, which is carried out in said system, and as shown in FIG. 15, comprises:

(1) subjecting maleic anhydride and a monomer MB represented by formula (I) to copolymerization reaction in the presence of an initiator, a cross-linking agent and a reaction solvent, in the copolymerization unit of the system, to obtain a polymer mother liquid containing maleic anhydride-based copolymer microspheres,

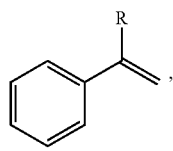

formula (I)

R being H or methyl;

(2) subjecting the polymer mother liquid to a continuous first separation to obtain a separated solid-containing phase and a separation liquid;
(3) reacting the separated solid-containing phase with an alkali liquid, and continuously subjecting the obtained product to a second separation, to obtain a centrifuged slag phase containing ionomer microspheres, an aqueous phase and a separation liquid-II;
(4) introducing the centrifuged slag phase to the washing unit of the system, performing at least one alcohol washing and a third separation, to obtain an ionomer slag phase and a washing clear liquid;
(5) feeding the ionomer slag phase to the drying unit of the system for drying to obtain cross-linked maleic acid ionomer microspheres; and
(6) introducing the separation liquid-I, separation liquid-II and washing clear liquid to the solvent recovery unit of the system, and returning the recovered solvent and recovered alcohol obtained by recovery to steps (1) and (4), respectively.

According to this aspect of the invention, the specific conditions that can be employed in step (1) are as described above for the method for preparing the ionomer microspheres of the invention.

According to this aspect of the invention, the kind and amount of the base used in step (3) are as described above for the general method for the preparation of maleic acid ionomer microspheres (when $M_1$ and $M_2$ are each independently selected from H and metal cations).

According to this aspect of the invention, preferably, the concentration of the alkali liquid may be 1-50% by weight.

According to this aspect of the invention, step (3) involves the reaction of the separated solid-containing phase with the alkali liquid to obtain an ionomer. Preferably, the reaction temperature is 20-80° C., preferably 30-70° C., and the reaction time is 0.5-8 h, preferably 0.5-3 h.

According to this aspect of the invention, step (4) is used for washing the centrifuged slag phase to remove the residues of the copolymerization reaction and the reaction in step (3). Preferably, the alcohol washing uses, in total, 100-250 L of alcohol solvent, more preferably 150-200 L, relative to 100 mol of maleic anhydride. Preferably, the alcohol solvent is selected from methanol or ethanol.

According to this aspect of the invention, steps (2), (3) and (4) all relate to separation of microspheres from the obtained microsphere-containing materials. For example, in step (2), the polymer mother liquid containing maleic anhydride-based copolymer microspheres is subjected to a first separation; in step (3), the product containing ionomer microspheres is subjected to a second separation; and in step (4), the centrifuged slag phase containing the copolymer microspheres after the alcohol washing is subjected to a continuous third separation. These microsphere-containing materials are subjected to solid-liquid separation under high concentration conditions to obtain highly pure, ultra-fine microspheres. Preferably, the separation factor of the first separation in step (2) is greater than 9,000, preferably 9,000-60,000; the separation factor of the second separation in step (3) is greater than 9,000, preferably 9,000-60,000; the separation factor of the third separation in step (4) is greater than 9,000, preferably 9,000-60,000. Within the above defined range of the separation factor, the industrialized continuous performing of the above various separations in steps (2) to (4) in the invention under the condition of high concentration microsphere content can be achieved.

In step (5) of this aspect of the invention, the drying temperature is 50-150° C., and the drying pressure may be 10-1013 mbar, preferably 10-200 mbar, to further remove the reaction solvent and/or alcohol solvent entrained in the slag phase.

In this aspect of the invention, step (6) is used to recover the solvent and the alcohol, and is performed in the solvent recovery unit of the system provided by the invention. The operation and control conditions for each partial device in the solvent recovery unit shall be sufficient for the recovery of the reaction solvent and the alcohol in the separation liquid-I, separation liquid-II and washing clear liquid.

In this method provided by the invention, the object of the invention can be better achieved under the above-defined conditions, continuous preparation of a maleic acid ionomer having a cross-linked and microspheric structure can be achieved, the air exposure operation of the solvent is avoided, and frequent start and stop operations of the centrifuge is avoided.

Applications

The ionomer prepared by the invention has a cross-linked structure and is in a microsphere shape. The ionomer according to the invention can be used as a nucleating agent in the modification of PET. In practical use, the ionomer of the invention can be melt-blended with PET, which can be performed in a conventional blending equipment. The amount of the ionomer can be 0.5-5 g relative to 100 g of PET. The temperature of the melt blending may be 250-300° C. The time period of the melt blending may be 5-8 min. The melt-blended product is then subjected to extrusion pelletizing to obtain a modified PET product.

Thus the invention also provides a polyethylene terephthalate composition comprising an ionomer according to the invention as a nucleating agent. In addition, the invention also provides a method for modifying polyethylene terephthalate, wherein the ionomer according to the invention is introduced as a nucleating agent into polyethylene terephthalate.

In the following, the invention will be exemplified by means of examples, but it is not intended to limit the invention to the scope disclosed in the examples.

EXAMPLES

In the following examples and comparative examples:
conditions for vacuum drying: 100° C., vacuum degree of −0.095 MPa, time period of 8 h;
infrared spectrum analysis: determined by the instrument Spectrum Two of the company PerkinElmer;
average particle size: determined by selecting 300-500 microspheres in a scanning electron microscope photograph, measuring their diameters, and calculating the average particle size of the microspheres using a mathematical average method;
scanning electron microscope analysis: determined by the instrument XL-30ESEM-FEG of the company FEI;
method for measuring the cross-linking degree: weighing 2-3 g of the polymer microspheres (w1), wrapping them with medium-speed qualitative filter paper, placing in a Soxhlet extractor and extracting with tetrahydrofuran for 24 h, drying and weighing the obtained polymer residue (w2), calculating with w2/w1 to obtain the cross-linking degree:

$$\text{cross-linking degree} = \frac{w2}{w1} \times 100\%;$$

turbidity: determined using a turbidimeter, the turbidity value being characterized by the particle concentration (mass in g of the particles in 100 g of the solvent, in % by weight).

Example 1: Maleic Acid Ester Ionomer Microspheres (1) 100 g of maleic anhydride, 118 g of α-methylstyrene, 26 g of divinylbenzene and 2 g of azobisisobutyronitrile were dissolved in 1000 mL of isoamyl acetate, and reacted at 70° C. for 5 hours under a nitrogen atmosphere. After the reaction, the system was centrifugally separated with a centrifuge under the condition of 5000 rad/min for 30 minutes to obtain cross-linked α-methyl styrene/maleic anhydride polymer microspheres, which were purified by washing with n-hexane and dried under vacuum. At the same time, the supernatant after centrifugal separation was analyzed by LC-MC (liquid chromatography-mass spectrometry), to determine the amount of the remaining monomers therein. The amount of the monomers (or the amount of the cross-linking agent) charged minus the amount of the remaining monomers (or the amount of the cross-linking agent) obtained the amount of the monomers (or the amount of the cross-linking agent) that was actually involved in the reaction, to thereby obtain the molar ratio among structure unit A, structure unit B and cross-linking structural unit, specifically as shown in Table 1 below (hereinafter the same; upon the preparation with one-pot method, taking a small amount of the supernatant after the first centrifugal separation to determine the amount of the monomers).

(2) 50 g of cross-linked α-methyl styrene/maleic anhydride polymer microspheres and 4.4 g of sodium hydroxide (the amount of the base was 0.55 mol per mole of maleic anhydride) were added to 200 mL of methanol for reaction at 64.7° C. for 5 hours. After the reaction, the system was centrifugally separated with a centrifuge under the condition of 5000 rad/min for 30 minutes, the obtained solid was added with 300 mL of methanol, stirred and washed, followed by centrifugal separation with a centrifuge under the condition of 5000 rad/min for 30 minutes, the obtained solid was added with 300 mL of methanol, stirred and washed, followed by centrifugal separation with a centrifuge under the condition of 5000 rad/min for 30 minutes, the obtained solid was dried under vacuum to obtain cross-linked α-methyl styrene/methyl maleate sodium salt ionomer microspheres (referred to as C1).

Example 2: Maleic Acid Ester Ionomer Microspheres (1) 100 g of maleic anhydride, 118 g of α-methyl styrene, 26 g of divinylbenzene and 2 g of azobisisobutyronitrile were dissolved in 1000 mL of isoamyl acetate, and reacted at 70° C. for 5 hours under a nitrogen atmosphere. After the reaction, the system was centrifugally separated with a centrifuge under the condition of 5000 rad/min for 30 minutes to obtain cross-linked α-methyl styrene/maleic anhydride polymer microspheres, which were purified by washing with methanol and dried under vacuum.

(2) 50 g of cross-linked α-methyl styrene/maleic anhydride polymer microspheres and 2.2 g of sodium hydroxide (the amount of the base was 0.28 mol per mole of maleic anhydride) were added to 200 mL of ethanol for reaction at 78° C. for 4 hours. After the reaction, the system was centrifugally separated with a centrifuge under the condition of 5000 rad/min for 30 minutes, the obtained solid was added with 300 mL of ethanol, stirred and washed, followed by centrifugal separation with a centrifuge under the condition of 5000 rad/min for 30 minutes, the obtained solid was added with 300 mL of ethanol, stirred and washed, followed by centrifugal separation with a centrifuge under the condition of 5000 rad/min for 30 minutes, the obtained solid was dried under vacuum to obtain cross-linked α-methyl styrene/ethyl maleate sodium salt ionomer microspheres (referred to as C2).

Example 3: Maleic Acid Ester Ionomer Microspheres (1) 100 g of maleic anhydride, 118 g of α-methyl styrene, 26 g of divinylbenzene and 2 g of azobisisobutyronitrile were dissolved in 1000 mL of isoamyl acetate, and reacted at 70° C. for 5 hours under a nitrogen atmosphere. After the reaction, the system was centrifugally separated with a centrifuge under the condition of 5000 rad/min for 30 minutes to obtain cross-linked α-methyl styrene/maleic anhydride polymer microspheres, which were purified by washing with methanol and dried under vacuum.

(2) 50 g of cross-linked α-methyl styrene/maleic anhydride polymer microspheres and 6.2 g of potassium hydroxide (the amount of the base was 0.55 mol per mole of maleic anhydride) were added to 300 mL of isopropanol for reaction at 80° C. for 4 hours. After the reaction, the system was centrifugally separated with a centrifuge under the condition of 5000 rad/min for 30 minutes, the obtained solid was added with 300 mL of isopropanol, stirred and washed, followed by centrifugal separation with a centrifuge under the condition of 5000 rad/min for 30 minutes, the obtained solid was added with 300 mL of isopropanol, stirred and washed, followed by centrifugal separation with a centrifuge under the condition of 5000 rad/min for 30 minutes, the obtained solid was dried under vacuum to obtain cross-linked α-methyl styrene/isopropyl maleate potassium salt ionomer microspheres (referred to as C3).

Example 4: Maleic Acid Ester Ionomer Microspheres (1) 130 g of maleic anhydride, 118 g of α-methyl styrene, 26 g of divinylbenzene and 2.5 g of azobisisobutyronitrile were dissolved in 1000 mL of isoamyl acetate, and reacted at 60° C. for 12 hours under a nitrogen atmosphere. After the reaction, the system was centrifugally separated with a centrifuge under the condition of 5000 rad/min for 30 minutes to obtain cross-linked α-methyl styrene/maleic anhydride polymer microspheres, which were purified by washing with methanol and dried under vacuum.

(2) 50 g of cross-linked α-methyl styrene/maleic anhydride polymer microspheres and 6.6 g of sodium hydroxide (the amount of the base was 0.83 mol per mole of maleic anhydride) were added to 300 mL of 2-propylheptanol for reaction at 90° C. for 4 hours. After the reaction, the system was centrifugally separated with a centrifuge under the condition of 5000 rad/min for 30 minutes, the obtained solid was added with 300 mL of ethanol, stirred and washed, followed by centrifugal separation with a centrifuge under the condition of 5000 rad/min for 30 minutes, the obtained solid was added with 500 mL of ethanol, stirred and washed, followed by centrifugal separation with a centrifuge under the condition of 5000 rad/min for 30 minutes, the obtained solid was dried under vacuum to obtain cross-linked α-methyl styrene/$C_{10}$ alcohol maleate sodium salt ionomer microspheres (referred to as C4).

Example 5: Maleic Acid Ester Ionomer Microspheres (1) 130 g of maleic anhydride, 104 g of styrene, 26 g of divinylbenzene and 2.5 g of azobisisobutyronitrile were dissolved in 1000 mL of isoamyl acetate, and reacted at 60° C. for 10 hours under a nitrogen atmosphere. After the reaction, the system was centrifugally separated with a centrifuge under the condition of 5000 rad/min for 30 minutes, to obtain cross-linked α-methyl styrene/maleic anhydride polymer microspheres, which were purified by washing with methanol and dried under vacuum.

(2) 50 g of cross-linked α-methyl styrene/maleic anhydride polymer microspheres and 13.5 g of sodium ethoxide (the amount of the base was 0.98 mol per mole of maleic anhydride) were added to 200 mL of ethanol for reaction at 78° C. for 4 hours. After the reaction, the system was centrifugally separated with a centrifuge under the condition of 5000 rad/min for 30 minutes, the obtained solid was added with 400 mL of ethanol, stirred and washed, followed by centrifugal separation with a centrifuge under the condition of 5000 rad/min for 30 minutes, the obtained solid was added with 500 mL of ethanol, stirred and washed, followed by centrifugal separation with a centrifuge under the condition of 5000 rad/min for 30 minutes, the obtained solid was dried under vacuum to obtain cross-linked α-methyl styrene/ethyl maleate potassium salt ionomer microspheres (referred to as C5).

Example 6: Maleic Acid Ester Ionomer Microspheres

Ionomer microspheres were prepared according to the method of Example 1, except that the amount of divinylbenzene was 10 g, to obtain ionomer microspheres $C_6$.

Example D1: Maleic Acid Ionomer Microspheres (1) 100 g of maleic anhydride, 118 g of α-methyl styrene, 26 g of divinylbenzene and 2 g of azobisisobutyronitrile were dissolved in 1000 mL of isoamyl acetate, and reacted at 70° C. for 5 hours under a nitrogen atmosphere. After the reaction, the system was centrifugally separated with a centrifuge under the condition of 5000 rad/min for 30 minutes to obtain cross-linked α-methyl styrene/maleic anhydride polymer microspheres, which were purified by washing with n-hexane and dried under vacuum.

(2) 50 g of cross-linked a-methyl styrene/maleic anhydride polymer microspheres and 13.5 g of sodium ethoxide (the amount of the base was 0.98 mol per mole of maleic anhydride) were added to 200 mL of ethanol for reaction at 78° C. for 4 hours. After the reaction, the system was centrifugally separated with a centrifuge under the condition of 5000 rad/min for 30 minutes, the obtained solid was added with 400 mL of ethanol, stirred and washed, followed by centrifugal separation with a centrifuge under the condition of 5000 rad/min for 30 minutes, the obtained solid was added with 500 mL of ethanol, stirred and washed, followed by centrifugal separation with a centrifuge under the condition of 5000 rad/min for 30 minutes, the obtained solid was dried under vacuum to obtain cross-linked a-methyl styrene/ethyl maleate sodium salt ionomer microspheres (referred to as C5).

Example D2: Maleic Acid Ionomer Microspheres (1) 100 g of maleic anhydride, 118 g of α-methylstyrene, 26 g of divinylbenzene and 2 g of azobisisobutyronitrile were dissolved in 1000 mL of isoamyl acetate, and reacted at 70° C. for 5 hours under a nitrogen atmosphere. After the reaction, the system was centrifugally separated with a centrifuge under the condition of 5000 rad/min for 30 minutes to obtain cross-linked α-methyl styrene/maleic anhydride polymer microspheres, which were purified by washing with methanol and dried under vacuum.

(2) 20.5 g of sodium acetate was dissolved in 300 mL of water, 50 g of the cross-linked α-methyl styrene/maleic anhydride polymer microspheres was added to the resulting aqueous solution of sodium acetate (the amount of the base was 1.2 mol per mole of maleic anhydride) for reaction at 100° C. for 4 hours. After the reaction, the system was centrifugally separated with a centrifuge under the condition of 5000 rad/min for 30 minutes, the obtained solid was added with 400 mL of water, stirred and washed, followed by centrifugal separation with a centrifuge under the condition of 5000 rad/min for 30 minutes, the obtained solid was added with 500 mL of methanol, stirred and washed, followed by centrifugal separation with a centrifuge under the condition of 5000 rad/min for 30 minutes, the obtained solid was dried under vacuum to obtain cross-linked α-methyl styrene/maleic acid sodium salt ionomer microspheres (referred to as D2).

Example D3: Maleic Acid Ionomer Microspheres (1) 100 g of maleic anhydride, 118 g of α-methyl styrene, 26 g of divinylbenzene and 2 g of azobisisobutyronitrile were dissolved in 1000 mL of isoamyl acetate, and reacted at 70° C. for 5 hours under a nitrogen atmosphere. After the reaction, the system was centrifugally separated with a centrifuge under the condition of 5000 rad/min for 30 minutes to obtain cross-linked α-methyl styrene/maleic anhydride polymer microspheres, which were purified by washing with methanol and dried under vacuum.

(2) 36.7 g of zinc acetate was dissolved in 400 mL of water, 50 g of the cross-linked α-methyl styrene/maleic anhydride polymer microspheres was added to the resulting aqueous solution of zinc acetate (the amount of the base was 1 mol per mole of maleic anhydride) for reaction at 100° C. for 8 hours. After the reaction, the system was centrifugally separated with a centrifuge under the condition of 5000 rad/min for 30 minutes, the obtained solid was added with 400 mL of water, stirred and washed, followed by centrifugal separation with a centrifuge under the condition of 5000 rad/min for 30 minutes, the obtained solid was added with 500 mL of methanol, stirred and washed, followed by centrifugal separation with a centrifuge under the condition of 5000 rad/min for 30 minutes, the obtained solid was dried under vacuum to obtain cross-linked α-methyl styrene/ maleic acid zinc salt ionomer microspheres (referred to as D3).

Example D4: Maleic Acid Ionomer Microspheres (1) 130 g of maleic anhydride, 118 g of α-methyl styrene, 26 g of divinylbenzene and 2.5 g of azobisisobutyronitrile were dissolved in 1000 mL of isoamyl acetate, and reacted at 60° C. for 12 hours under a nitrogen atmosphere. After the reaction, the system was centrifugally separated with a centrifuge under the condition of 5000 rad/min for 30 minutes to obtain cross-linked α-methyl styrene/maleic anhydride polymer microspheres, which were purified by washing with methanol and dried under vacuum.

(2) 15.6 g of lithium hydroxide monohydrate was dissolved in 450 mL of water, 50 g of the cross-linked α-methyl styrene/maleic anhydride polymer microspheres was added to the resulting aqueous solution of lithium hydroxide (the amount of the base was 1.85 mol per mole of maleic anhydride) for reaction at 100° C. for 3 hours. After the reaction, the system was centrifugally separated with a centrifuge under the condition of 5000 rad/min for 30 minutes, the obtained solid was added with 400 mL of water, stirred and washed, followed by centrifugal separation with a centrifuge under the condition of 5000 rad/min for 30 minutes, the obtained solid was added with 500 mL of methanol, stirred and washed, followed by centrifugal separation with a centrifuge under the condition of 5000 rad/min for 30 minutes, the obtained solid was dried under vacuum to obtain cross-linked α-methyl styrene/maleic acid lithium salt ionomer microspheres (referred to as D4).

Example D5: Maleic Acid Ionomer Microspheres (1) 130 g of maleic anhydride, 118 g of α-methyl styrene, 26 g of divinylbenzene and 2.5 g of azobisisobutyronitrile were dissolved in 1000 mL of isoamyl acetate, and reacted at 60° C. for 12 hours under a nitrogen atmosphere. After the reaction, the system was centrifugally separated with a centrifuge under the condition of 5000 rad/min for 30 minutes to obtain cross-linked α-methyl styrene/maleic anhydride polymer microspheres, which were purified by washing with methanol and dried under vacuum.

(2) 15.0 g of potassium hydroxide was dissolved in 400 mL of water, 50 g of the cross-linked α-methyl styrene/ maleic anhydride polymer microspheres was added to the resulting aqueous solution of potassium hydroxide (the amount of the base was 1.3 mol per mole of maleic anhydride) for reaction at 30° C. for 3 hours. After the reaction, the system was centrifugally separated with a centrifuge under the condition of 5000 rad/min for 30 minutes, the obtained solid was added with 400 mL of water, stirred and washed, followed by centrifugal separation with a centrifuge under the condition of 5000 rad/min for 30 minutes, the obtained solid was added with 500 mL of methanol, stirred and washed, followed by centrifugal separation with a centrifuge under the condition of 5000 rad/min for 30 minutes, the obtained solid was dried under vacuum to obtain cross-linked α-methyl styrene/maleic acid potassium salt ionomer microspheres (referred to as D5).

Example D6: Maleic Acid Ionomer Microspheres (1) 100 g of maleic anhydride, 104 g of styrene, 26 g of divinylbenzene and 2.5 g of azobisisobutyronitrile were dissolved in 1000 mL of isoamyl acetate, and reacted in a water bath at 60° C. for 12 hours under a nitrogen atmosphere. After the reaction, the system was centrifugally separated with a centrifuge under the condition of 5000 rad/min for 30 minutes to obtain cross-linked styrene/maleic anhydride polymer microspheres, which were purified by washing with methanol and dried under vacuum.

(2) 13.5 g of sodium hydroxide was dissolved in 350 mL of water, 50 g of the cross-linked styrene/maleic anhydride polymer microspheres was added to the resulting aqueous solution of sodium hydroxide (the amount of the base was 1.6 mol per mole of maleic anhydride) for reaction at 100° C. for 3 hours. After the reaction, the system was centrifugally separated with a centrifuge under the condition of 5000 rad/min for 30 minutes, the obtained solid was added with 400 mL of water, stirred and washed, followed by centrifugal separation with a centrifuge under the condition of 5000 rad/min for 30 minutes, the obtained solid was added with 500 mL of methanol, stirred and washed, followed by centrifugal separation with a centrifuge under the condition of 5000 rad/min for 30 minutes, the obtained solid was dried under vacuum to obtain cross-linked styrene/maleic acid sodium salt ionomer microspheres (referred to as 06).

Example D7: Maleic Acid Ionomer Microspheres (1) 1000 g of maleic anhydride, 1180 g of α-methyl styrene, 260 g of divinylbenzene and 20 g of azobisisobutyronitrile were dissolved in 10 L of isoamyl acetate, and reacted at 70° C. for 5 hours under a nitrogen atmosphere.

(2) 3500 g (14 wt %) of an aqueous solution of sodium hydroxide was added to the system after the reaction in step (1) for reaction at 80° C. for 3 hours. After the reaction, the system was allowed to stand still to separate into layers. The heavy phase was centrifugally separated with a centrifuge under the condition of 5000 rad/min for 20 minutes, the obtained solid was added with 4 L of water, stirred and washed, followed by centrifugal separation with a centrifuge under the condition of 5000 rad/min for 20 minutes, the obtained solid was added with 4 L of water, stirred and washed, followed by centrifugal separation with a centrifuge under the condition of 5000 rad/min for 20 minutes, the obtained solid was dried under vacuum to obtain cross-linked α-methyl styrene/maleic acid sodium salt ionomer microspheres (referred to as D7).

(3) The system after the reaction in step (1) was centrifugally separated with a centrifuge under the condition of 5000 rad/min for 30 minutes, to obtain cross-linked α-methyl styrene/maleic anhydride polymer microspheres, which were purified by washing with a solvent and dried under vacuum. Then 3500 g of an aqueous solution of sodium hydroxide (10% by weight, the amount of the base was 1.25 mol per mole of maleic anhydride) was added for reaction at 80° C. for 3 hours. After the reaction, the system was centrifugally separated with a centrifuge under the condition of 5000 rad/min for 30 minutes, the obtained solid was added with 400 mL of water, stirred and washed, followed by centrifugal separation with a centrifuge under the condition of 5000 rad/min for 30 minutes, the obtained solid was added with 500 mL of methanol, stirred and washed, followed by centrifugal separation with a centrifuge under the condition of 5000 rad/min for 30 minutes, the obtained solid was dried under vacuum to obtain cross-linked α-methyl styrene/maleic acid sodium salt ionomer microspheres (referred to as D7-1).

Example D8: Maleic Acid Ionomer Microspheres (1) 1000 g of maleic anhydride, 1180 g of α-methyl styrene, 600 g of ethylene glycol dimethacrylate and 25 g of azobisisobutyronitrile were dissolved in 15 L of isoamyl acetate, and reacted at 70° C. for 5 hours under a nitrogen atmosphere.

(2) After the reaction, 1000 g (10 wt %) of an aqueous solution of lithium hydroxide was added for reaction at 90° C. for 0.5 hours. After the reaction, the system was allowed to stand still to separate into layers. The heavy phase was centrifugally separated with a centrifuge under the condition of 5000 rad/min for 20 minutes, the obtained solid was added with 4 L of water, stirred and washed, followed by centrifugal separation with a centrifuge under the condition of 5000 rad/min for 20 minutes, the obtained solid was added with 4 L of water, stirred and washed, followed by centrifugal separation with a centrifuge under the condition of 5000 rad/min for 20 minutes, the obtained solid was dried under vacuum to obtain cross-linked α-methyl styrene/maleic acid lithium salt ionomer microspheres (referred to as D8).

Example D9: Maleic Acid Ionomer Microspheres

Ionomer microspheres were prepared according to the method of Example D1, except that the amount of divinylbenzene was 10 g to obtain ionomer microspheres D9.

Comparative Example E1

(1) 98 g of maleic anhydride and 118 g of α-methyl styrene were weighed and placed into a three-necked flask equipped with a nitrogen inlet, a stirrer, a thermometer, a condenser and a reflux condensing tube, followed by the addition of 2 g of azobisisobutyronitrile as initiator and the addition of an appropriate amount of toluene as reaction solvent, for reaction at 70° C. for 5 hours under a nitrogen atmosphere. After the reaction, the polymer was suction filtered, the filter cake was washed 3 times with toluene and dried under vacuum to obtain α-methyl styrene/maleic anhydride polymer.

(2) 20.2 g of the α-methyl styrene/maleic anhydride polymer was dissolved in 200 mL of 1,4-dioxane, and 4 g of a saturated aqueous solution of sodium hydroxide was added for reaction at room temperature for 3 hours. After the reaction, an ionomer solid was obtained by filtration. The obtained solid was dried under vacuum to obtain α-methyl styrene/maleic acid sodium salt ionomer (referred to as E1).

Test Example 1

Figure 3:
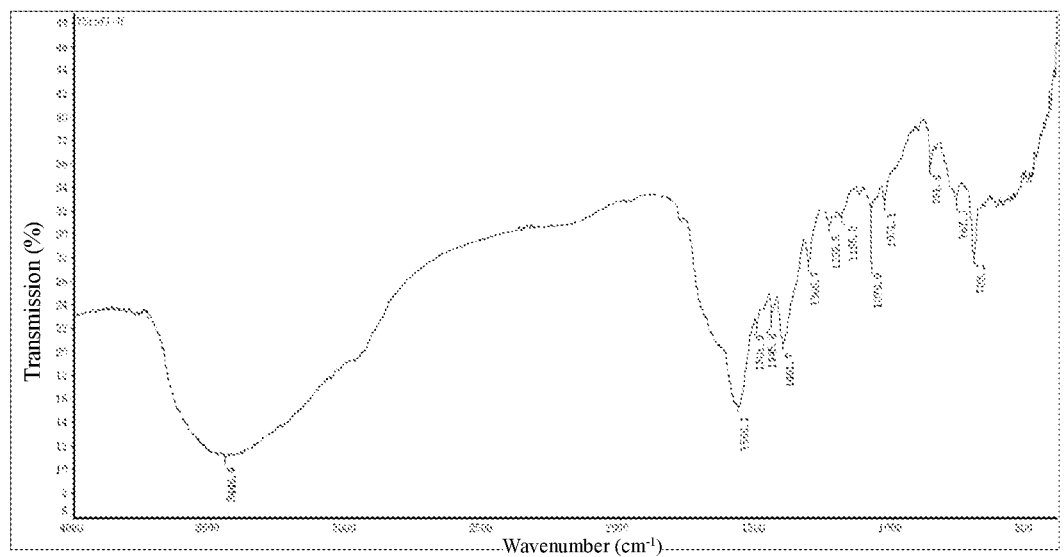
FIG. 3 is an infrared spectrum of the styrene/maleic acid sodium salt ionomer synthesized in Example D1.
Figure 5:
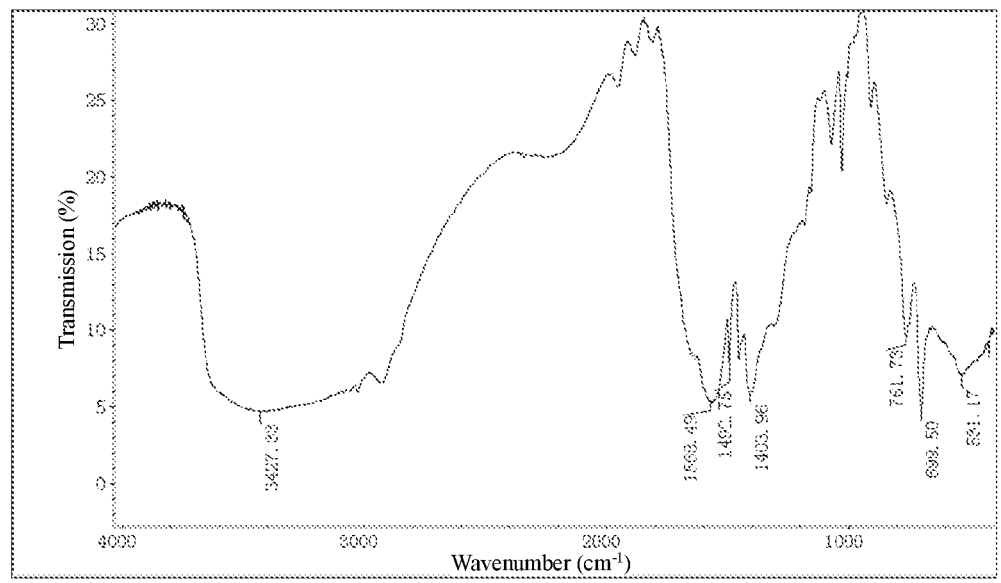
FIG. 5 is an infrared spectrum of the styrene/maleic acid sodium salt ionomer synthesized in Comparative Example E1.

(1) The polymers obtained in Example 1, Example D1 and Comparative Example E1 were analyzed by infrared spectrum. The results are shown in FIG. 1, FIG. 3, and FIG. 5, respectively. From the results of infrared spectrum analysis, it can be seen that ionomers were successfully synthesized. The results of infrared spectrum analysis of Examples 2-6 are similar to those of Example 1, and the results of infrared spectrum analysis of Examples D2-D9 are similar to those of Example D1. They all successfully obtained ionomers.

(2) The ionomer microspheres prepared in the above examples and comparative examples were subjected to X-ray fluorescence spectrum analysis to determine the content of metal cations in the ionomers, i.e., the percentage based on the total molar amount of the structure unit A in the ionomers.

Figure 2:
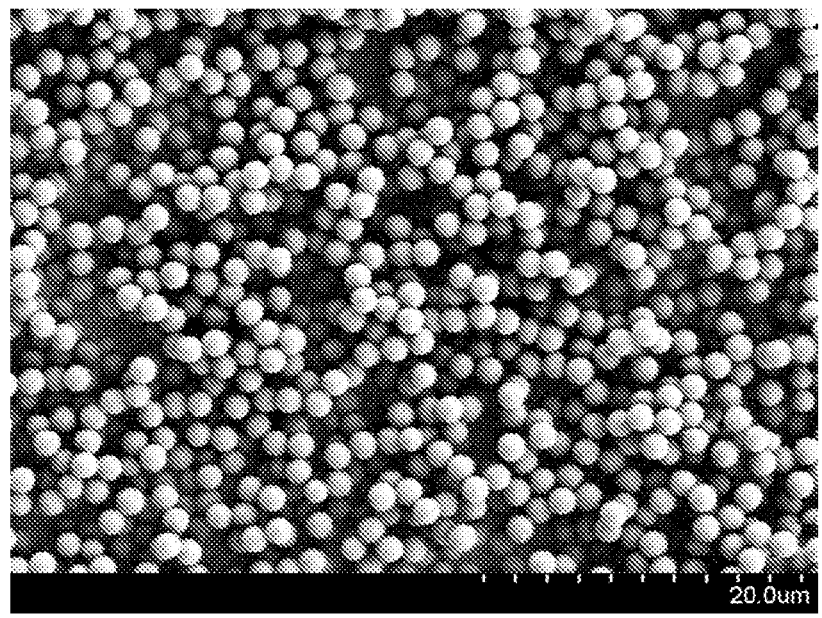
FIG. 2 is a scanning electron microscope photograph of the ionomer synthesized in Example 1.
Figure 4:
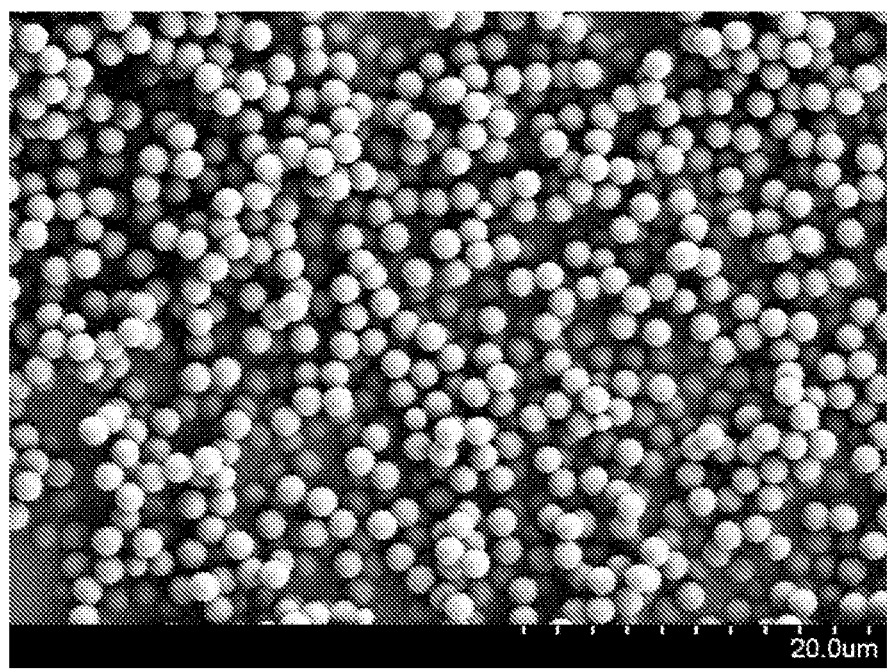
FIG. 4 is a scanning electron microscope photograph of the styrene/maleic acid sodium salt ionomer synthesized in Example D1.

(3) The ionomers prepared in the above Examples and Comparative Examples were detected by scanning electron microscopy. The scanning electron microscope images of the ionomers obtained in Example 1 and Example D1 are shown in FIG. 2 and FIG. 4, respectively. It can be seen that the ionomers of the invention have a microspheic shape, while the ionomer obtained in Comparative Example E1 does not have a microspherc structure. The average particle size, the cross-inking degree and the like of the ionomer microspheres as tested are shown in Table 1 below.

TABLE 1

|    | Molar ratio of structure unit A, structure unit B and cross-linking structure | Molar ratio of metal cation to structure unit A | Cross-linking degree(%) | Shape | Average particle size (nm) |
|----|---|---|---|---|---|
| C1 | 100:102:28 | 53:100 | 84 | Microspheres | 1002 |
| C2 | 100:101:29 | 25:100 | 75 | Microspheres | 1121 |

TABLE 1-continued

| | Molar ratio of structure unit A, structure unit B and cross-linking structure | Molar ratio of metal cation to structure unit A | Cross-linking degree(%) | Shape | Average particle size (nm) |
|---|---|---|---|---|---|
| C3 | 100:100:30 | 55:100 | 81 | Microspheres | 1024 |
| C4 | 100:101:28 | 83:100 | 68 | Microspheres | 1057 |
| C5 | 100:103:29 | 95:100 | 70 | Microspheres | 1055 |
| C6 | 100:101:11 | 51:100 | 57 | Microspheres | 954 |
| D1 | 100:102:28 | 115:100 | 84 | Microspheres | 1002 |
| D2 | 100:101:29 | 109:100 | 75 | Microspheres | 1121 |
| D3 | 100:100:30 | 98:100 | 81 | Microspheres | 1024 |
| D4 | 100:101:28 | — | 68 | Microspheres | 1057 |
| D5 | 100:101:28 | 105:100 | 80 | Microspheres | 986 |
| D6 | 100:103:29 | 107:100 | 70 | Microspheres | 1055 |
| D7 | 100:102:28 | 103:100 | 73 | Microspheres | 1073 |
| D7-1 | 100:102:28 | 105:100 | 72 | Microspheres | 1007 |
| D8 | 100:101:42 | — | 77 | Microspheres | 868 |
| D9 | 100:101:11 | 112:100 | 57 | Microspheres | 954 |
| E1 | — | 102:100 | — | — | — |

(4) The ionomer microspheres prepared in the above examples and comparative examples were mixed uniformly with PET (purchased from Sinopec Yizheng Chemical Fibre Company, Brand: BG80), respectively, the addition amount of the ionomer microspheres was 1% by weight based on the weight of PET, then melt-blending was performed at 280° C. for 8 minutes, followed by extrusion pelletization, to obtain modified polyethylene terephthalate.

The modified PET was subjected to differential scanning calorimetry (DSC) test, with unmodified PET as control. The test conditions were: first temperature rise, starting from 50° C., maintaining the temperature constant for 1 min, then raising the temperature to 280° C. at a rate of 10° C./min and maintaining the temperature constant for 3 min, then decreasing the temperature to 50° C. at a rate of 10/min and maintaining the temperature constant for 1 min; the second temperature rise, starting from 50° C., raising the temperature to 280° C. at a rate of 10° C./min. The results are shown in Table 2.

TABLE 2

| Items | Cold crystallization peak $T_{cc}$/° C. | Melt crystallization peak $T_{mc}$/° C. | Half-peak width/° C. | $\Delta H$/ $J \cdot g^{-1}$ |
|---|---|---|---|---|
| PET | — | 151.7 | 23.3 | −11.3 |
| C1 modified PET | 116.7 | 214.1 | 7.2 | −39.4 |
| C2 modified PET | 117.5 | 212.4 | 6.5 | −38.7 |
| C3 modified PET | 119.2 | 210.5 | 7.1 | −38.1 |
| C4 modified PET | 118.4 | 213.7 | 6.2 | −39.8 |
| C5 modified PET | 116.0 | 214.7 | 6.0 | −39.7 |
| C6 modified PET | 130.0 | 197.0 | 8.9 | −35.5 |
| D1 modified PET | 127.3 | 204.8 | 5.3 | −36.7 |
| D2 modified PET | 130.2 | 202.3 | 6.5 | −34.6 |
| D3 modified PET | 128.6 | 201.3 | 5.8 | −35.1 |
| D4 modified PET | 129.3 | 200.8 | 6.3 | −33.8 |
| D5 modified PET | 130.5 | 199.5 | 7.2 | −35.0 |
| D6 modified PET | 128.8 | 203.0 | 6.1 | −34.8 |
| D7 modified PET | 129.5 | 202.2 | 6.4 | −36.8 |
| D7-1 modified PET | 130.7 | 200.8 | 6.6 | −36.6 |
| D8 modified PET | 132.8 | 195.5 | 9.5 | −32.7 |
| D9 modified PET | 131.7 | 196.3 | 8.9 | −32.8 |
| E1 modified PET | 134.7 | 195.2 | 10.2 | −35.0 |

From the results in Table 2, it can be seen that the ionomers prepared by the method of the invention have a significantly better effect on nucleation of PET than the comparative example, can significantly increase the crystallization temperature of PET and accelerate the crystallization rate, and furthermore, have a better effect on nucleation of PET than the non-crosslinked α-methyl styrene/maleic acid sodium salt ionomer having no microspheric structure. In addition, when an ester group is introduced, the compatibility of the cross-linked ionomer microspheres with PET was increased, and better effect on nucleation of PET was achieved compared with the ionomer microspheres that do not contain an ester group.

In addition, from a comparison between Example 1 and Example 6, and from a comparison between Example D1 and Examples D8-D9, it can be seen that a better nucleation effect can be obtained by controlling the amount of the cross-linking agent in a preferred range.

Test Example 2

In this test example, PET was purchased from Sinopec Yizheng Chemical Fibre Company, having an intrinsic viscosity of 0.7 dl/g and the Brand of BG80. The flame retardant was a nitrogen-phosphorus halogen-free flame retardant (HT202A), purchased from Jinan Taixing Fine Chemicals. Co., Ltd. The lubricant was PET100, purchased from the Britain Croda Company. Glass fiber (or GF) was purchased from Zhejiang Jushi Group Co., Ltd., Brand ER13-2000-988A. Processing aids included antioxidants, purchased from the company Ciba Specialty Chemicals, Brand Irganox 1010 and Irgafos 168.

The specific steps of the test were as follows:

100 parts by weight of PET, 1.5 parts by weight of ionomer microspheres, 0.2 parts by weight of processing aids (Irganox 1010 and Irgafos 168 in a weight ratio of 1:1), 8 parts by weight of a flame retardant and 0.04 parts by weight of a lubricant were weighed and placed into a high-speed stirrer to be stirred uniformly, and extruded using the WP ZSK25 twin-screw extruder at the temperatures of various zones: 230-245-255-260-260-260° C.; glass fiber was added in the feeding port of the twin-screw extruder; after extrusion, cooling and pellitization, and drying (100° C., 8 h), the pellets were injection molded into standard sample pieces using Haitian MA1200/370 injection molding machine (mold temperature of 60° C.) at temperatures of 230-240-255-260-260° C., for performance tests.

Using an injection molding machine (Ningbo Haitian MA1200/370) for injection molding, standard splines with a size of 170 mm (length)×25 mm (width)×4 mm (thickness) and a parallel section of 10 mm (width)×4 mm (thickness) were obtained. The tensile strength and elongation at break of the standard splines were determined by the test method for tensile properties of plastics according to GB/T1040-1992.

Using an injection molding machine (Ningbo Haitian MA1200/370) for injection molding, standard splines with a size of 80 mm (length)×10 mm (width)×4 mm (thickness) were obtained. The flexural strength and flexural modulus of the standard splines were determined by the test method for flexural properties of plastics according to GB/T9341-2008.

Using an injection molding machine (Ningbo Haitian MA1200/370) for injection molding, standard splines with a size of 80 mm (length)×10 mm (width)×4 mm (thickness) and a notch of 2 mm were obtained. The Charpy notched impact strength of the standard splines was determined by the test method for the Izod impact strength of plastics according to GB/T1043-93.

Deformation: Two injection-molded sample square pieces (60 mm×60 mm×2 mm) were taken, one of which was placed in an oven at 120° C. for 2 hours and the other of which was placed at room temperature. The deformation of the sample pieces was observed.

The results show that the use of the ionomers of the invention could make the obtained plastic articles have a tensile strength in the range of 118-145 MPa, an elongation at break of about 2%, a flexural strength in the range of 140-180 MPa, a flexural modulus in the range of 5.6-9.5 GPa and a Charpy notched impact strength in the range of 4.5-10 kJ/m$^2$, and no obvious deformation was observed when placed in the oven at 120° C. for 2 hours.

Continuous preparation process for maleic acid ionomer microspheres and maleic acid ester ionomer microspheres

Example F1

Isoamyl acetate was stored in the reaction solvent storage tank V-13. A reaction liquid was formulated in the reaction liquid mixing vessel R-11: 1014 mol of maleic anhydride, 12.2 mol of azobisisobutyronitrile, 200 mol of divinylbenzene, 1000 mol of α-methyl styrene and 1000 L of isoamyl acetate.

The reaction liquid was fed to the copolymerization reactor R-12 (two stirred tank reactors in parallel) for copolymerization reaction at 75° C. for 5 h under a nitrogen atmosphere. The polymer mother liquid containing the maleic anhydride-based copolymer microspheres obtained by the reaction was added to the first disc centrifuge S-21 through a metering pump (flow rate of 100 kg/h) for a continuous first separation (separation factor of 9000). The separation liquid-I obtained by separation passed through the first online turbidimeter A-21. When the turbidity was less than 0.1% by weight, it was sent to the separation liquid storage tank V-25, and when the turbidity was greater than 0.1% by weight, it was returned to the copolymerization reactor R-12. The separated solid-containing phase obtained by centrifugal separation was sent to the washing vessel R-22.

The methanol in the alcohol storage tank V-27 was sent to the washing vessel R-22 by a metering pump at a flow rate of 143 kg/h for an alcohol washing of the separated solid-containing phase, with the residence time being 1 h. The alcohol washed product was sent to the second disc centrifuge S-22 by a metering pump (flow rate of 173 kg/h) for a second separation (separation factor of 9000). The obtained washing clear liquid was sent to the clear liquid storage tank V-26 when the turbidity was less than 0.1% by weight as determined by the second online turbidimeter A-22, and it was returned to the washing vessel R-22 when the turbidity was greater than 0.1% by weight. The obtained copolymer slag phase was sent to the ionomer reactor R-32.

A methanol solution of sodium hydroxide in a concentration of 2.5% by weight was stored in the alkali liquid tank V-31. While the copolymer slag phase entered into the ionomer reactor R-32 (stirred tank reactor), the alkali liquid in the alkali liquid tank V-31 was sent into the ionomer reactor R-32 by a metering pump at a flow rate of 83 kg/h (relative to 100 mol of maleic anhydride, sodium hydroxide was used in an amount of 80 mol, and methanol was used in an amount of 3900 mol). Reaction was performed at 50° C., and the residence time was 1 h.

The product obtained by the reaction in the ionomer reactor R-32 was continuously fed from the bottom to the third disc centrifuge S-31 by a metering pump (flow rate of 122 kg/h) for a third separation (separation factor of 9000) to obtain a centrifuged slag phase containing the ionomer microspheres and a separation liquid-II. The separation liquid-II was conveyed to the clear liquid storage tank V-26 for reuse after refinement.

The centrifuged slag phase was sent to the rake vacuum dryer G-41 (46 kg/h) based on the material level difference, where the slag phase was dried. The drying temperature was 140° C., the pressure was 80 mbar, and the residence time was 4 h. The condenser E-41 had a condensation temperature of 0° C. Cross-linked α-methyl styrene/methyl maleate sodium salt ionomer microspheres with a yield of 17.5 kg/h were obtained.

Figure 6:
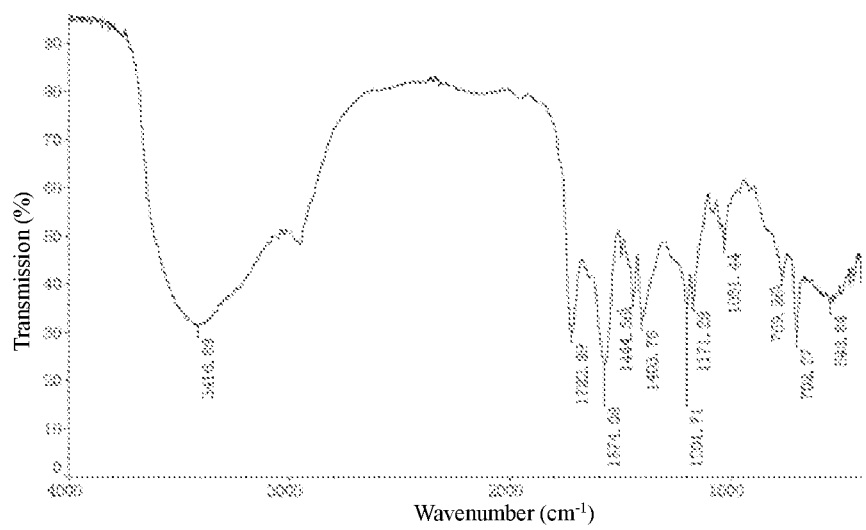
FIG. 6 is an infrared spectrum of the maleic acid ester ionomer microspheres obtained in Example F1.
Figure 7:
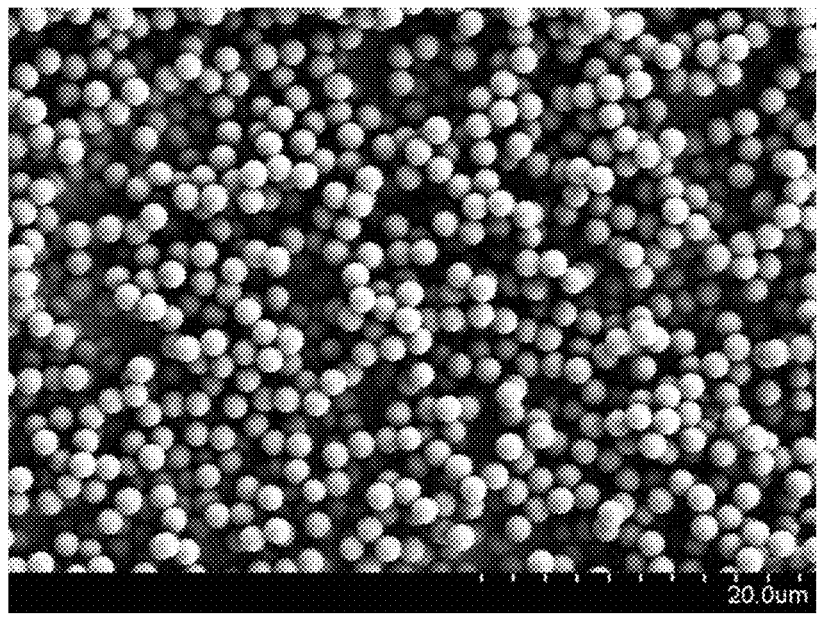
FIG. 7 is a scanning electron microscope photograph of the maleic acid ester ionomer microspheres obtained in Example F1.

Infrared spectrum analysis of the microspheres, as shown in FIG. 6, showed the characteristic peak of maleic acid sodium salt and maleic acid ester and the characteristic peak of aromatic ring, proving the existence of the structure of the target polymer. Scanning electron microscope analysis of the microspheres, as shown in FIG. 7, showed that the obtained microspheres had a microspheric structure; and the average particle diameter was determined to be 1521 nm. The cross-linking degree was determined to be 81%.

The stirred tank reactors R-12B and R-12A were connected in parallel and discharged the materials alternately.

The separation liquid in the separation liquid storage tank V-25 and the clear liquid in the clear liquid storage tank V-26 were respectively introduced to the reaction solvent rectification column T-52 in the reaction solvent recovery device and the alcohol rectification column T-51 in the alcohol solvent recovery device, to respectively recover the reaction solvent and methanol for reuse. The conditions for methanol recovery and reaction solvent recovery were as follows:

|  | Alcohol rectification column T-51 | Reaction solvent rectification column T-52 |
|---|---|---|
| Column top temperature/° C. | 68.9 | 74.0 |
| Column bottom temperature/° C. | 156.3 | 173.5 |
| Operation pressure/bar (gauge pressure) | 1.4 | −0.9 |
| Reflux ratio | 0.13 | 0.3 |

Example F2

This example was carried out according to the method of Example F1, except that ethanol was stored in the alcohol storage tank V-27, and cross-linked α-methyl styrene/ethyl maleate sodium salt ionomer microspheres with a yield of 18.3 kg/h were obtained.

Example F3

Isoamyl acetate was stored in the reaction solvent storage tank V-13. A reaction liquid was formulated in the reaction liquid mixing vessel R-11: 1014 mol of maleic anhydride, 10.14 mol of azobisisobutyronitrile, 150 mol of divinylbenzene, 750 mol of α-methyl styrene and 900 L of isoamyl acetate.

The reaction liquid was fed to the tubular reactor R-12 at a feed rate of 100 kg/h, under a nitrogen atmosphere, the temperature of the outlet of the tubular reactor R-12 was controlled at 90° C., and the residence time was 3 hours. The polymer mother liquid containing the maleic anhydride-based copolymer microspheres obtained by the reaction was added from the outlet of the reactor R-12 (flow rate of 100 kg/h) to the first disc centrifuge S-21 for a continuous first separation (separation factor of 12000). The separation liquid obtained by separation passed through the first online turbidimeter A-21. When the turbidity was less than 0.1% by weight, it was sent to the separation liquid storage tank V-25, and when the turbidity was greater than 0.1% by weight, it was returned to the copolymerization reactor R-12. The separated solid-containing phase obtained by centrifugal separation was sent to the washing vessel R-22.

The methanol for washing in the alcohol storage tank V-27 was sent to the washing vessel R-22 by a metering pump at a flow rate of 133 kg/h for an alcohol washing of the separated solid-containing phase, with the residence time being 1 h. The alcohol washed product was sent to the second disc centrifuge S-22 by a metering pump (flow rate of 162 kg/h) for a second separation (separation factor of 12000). The obtained washing clear liquid was sent to the clear liquid storage tank V-26 when the turbidity was less than 0.1% by weight as determined by the second online turbidimeter A-22, and it was returned to the washing vessel R-22 when the turbidity was greater than 0.1% by weight. The obtained copolymer slag phase was sent to the ionomer reactor R-32.

A methanol solution of potassium hydroxide in a concentration of 2.5% by weight was stored in the alkali liquid tank V-31. While the copolymer slag phase entered into the ionomer reactor R-32 (tubular reactor), the alkali liquid in the alkali liquid tank V-31 was sent into the ionomer reactor R-32 by a metering pump at a flow rate of 130 kg/h (relative to 100 mol of maleic anhydride, potassium hydroxide was used in an amount of 100 mol, and methanol was used in an amount of 6800 mol). The reactor temperature was controlled at 70° C., and the residence time was 1.5 h.

The product obtained by the reaction in the ionomer reactor R-32 was continuously fed to the third disc centrifuge S-31 by a metering pump (flow rate of 166 kg/h) for a third separation (separation factor of 12000) to obtain a centrifuged slag phase containing the ionomer microspheres and a separation liquid-II. The separation liquid-II was conveyed to the clear liquid storage tank V-26 for reuse after refinement.

The centrifuged slag phase was sent to the rake vacuum dryer G-41 (43 kg/h) based on the material level difference, where the slag phase was dried. The drying temperature was 100° C., the pressure was 10 mbar, and the residence time was 4 h. The condenser E-41 had a condensation temperature of 0° C. Cross-linked α-methyl styrene/methyl maleate potassium salt ionomer microspheres with a yield of 17.3 kg/h were obtained.

Infrared spectrum analysis of the microspheres showed the characteristic peak of maleic acid potassium salt and maleic acid ester and the characteristic peak of aromatic ring, proving the existence of the structure of the target polymer. Scanning electron microscope analysis of the microspheres showed that the obtained microspheres had a microspheric structure; and the average particle diameter was determined to be 1600 nm. The cross-linking degree was determined to be 78%.

The separation liquid in the separation liquid storage tank V-25 and the clear liquid in the clear liquid storage tank V-26 were respectively introduced to the reaction solvent rectification column T-52 in the reaction solvent recovery device and the alcohol rectification column T-51 in the alcohol solvent recovery device, to respectively recover the reaction solvent and methanol for reuse. The conditions for methanol recovery and reaction solvent recovery were as follows:

|  | Alcohol rectification column T-51 | Reaction solvent rectification column T-52 |
|---|---|---|
| Column top temperature/° C. | 68.9 | 74.0 |
| Column bottom temperature/° C. | 156.3 | 173.5 |
| Operation pressure/bar (gauge pressure) | 1.4 | −0.9 |
| Reflux ratio | 0.13 | 0.3 |

Example F4

Isoamyl acetate was stored in the reaction solvent storage tank V-13. A reaction liquid was formulated in the reaction liquid mixing vessel R-11: 1014 mol of maleic anhydride, mol of azobisisobutyronitrile, 180 mol of divinylbenzene, 850 mol of α-methyl styrene and 850 L of isoamyl acetate.

The reaction liquid was fed to the baffle reactor R-12 at a feed rate of 100 kg/h, under a nitrogen atmosphere, the temperature of the outlet of the baffle reactor R-12 was controlled at 85° C., and the residence time was 3 hours.

The polymer mother liquid containing the maleic anhydride-based copolymer microspheres obtained by the reaction was added from the outlet of the reactor R-12 (flow rate of 100 kg/h) to the first disc centrifuge S-21 for a continuous first separation (separation factor of 14000). The separation liquid obtained by separation passed through the first online turbidimeter A-21. When the turbidity was less than 0.1% by weight, it was sent to the separation liquid storage tank V-25, and when the turbidity was greater than 0.1% by weight, it was returned to the copolymerization reactor R-12. The separated solid-containing phase obtained by centrifugal separation was sent to the washing vessel R-22.

The methanol for washing in the alcohol storage tank V-27 was sent to the washing vessel R-22 by a metering pump at a flow rate of 170 kg/h for an alcohol washing of the separated solid-containing phase, with the residence time being 1 h. The alcohol washed product was sent to the second disc centrifuge S-22 by a metering pump (flow rate of 207 kg/h) for a second separation (separation factor of 14000). The obtained washing clear liquid was sent to the clear liquid storage tank V-26 when the turbidity was less than 0.1% by weight as determined by the second online turbidimeter A-22, and it was returned to the washing vessel R-22 when the turbidity was greater than 0.1% by weight. The obtained copolymer slag phase was sent to the ionomer reactor R-32.

A methanol solution of sodium hydroxide in a concentration of 2.5% by weight was stored in the alkali liquid tank V-31. While the copolymer slag phase entered into the ionomer reactor R-32 (baffle reactor), the alkali liquid in the alkali liquid tank V-31 was sent into the ionomer reactor R-32 by a metering pump at a flow rate of 22 kg/h (relative to 100 mol of maleic anhydride, sodium hydroxide was used in an amount of 20 mol, and methanol was used in an amount of 900 mol). The reactor temperature was controlled at 50° C., and the residence time was 0.75 h.

The product obtained by the reaction in the ionomer reactor R-32 was continuously fed from the bottom to the third disc centrifuge S-31 by a metering pump (flow rate of 66 kg/h) for a third separation (separation factor of 14000) to obtain a centrifuged slag phase containing the ionomer microspheres and a separation liquid-II. The separation liquid-II was conveyed to the clear liquid storage tank V-26 for reuse after refinement.

The centrifuged slag phase was sent to the rake vacuum dryer G-41 (48 kg/h) based on the material level difference, where the slag phase was dried. The drying temperature was 150° C., the pressure was 100 mbar, and the residence time was 4 h. The condenser had a condensation temperature of 0° C. Cross-linked α-methyl styrene/methyl maleate sodium salt ionomer microspheres with a yield of 19.5 kg/h were obtained.

Infrared spectrum analysis of the microspheres showed the characteristic peak of maleic anhydride and the characteristic peak of aromatic ring, proving the existence of the structure of the target polymer. Scanning electron microscope analysis of the microspheres showed that the obtained microspheres had a microspheric structure; and the average particle diameter was determined to be 2000 nm. The cross-linking degree was determined to be 80%.

The separation liquid in the separation liquid storage tank V-25 and the clear liquid in the clear liquid storage tank V-26 were respectively introduced to the reaction solvent rectification column T-52 in the reaction solvent recovery device and the alcohol rectification column T-51 in the alcohol solvent recovery device, to respectively recover the reaction solvent and methanol for reuse. The conditions for methanol recovery and reaction solvent recovery were as follows:

|  | Alcohol rectification column T-51 | Reaction solvent rectification column T-52 |
|---|---|---|
| Column top temperature/° C. | 68.9 | 74.0 |
| Column bottom temperature/° C. | 156.3 | 173.5 |
| Operation pressure/bar (gauge pressure) | 1.4 | −0.9 |
| Reflux ratio | 0.13 | 0.3 |

Comparative Example F1

The following reaction liquid was formulated in the polymer reaction tank: 1014 mol of maleic anhydride, 12.2 mol of azobisisobutyronitrile, 200 mol of divinylbenzene, 1000 mol of α-methyl styrene, and 1000 L of isoamyl acetate.

The reaction liquid was heated to 75° C. (temperature rise time of 1 h), and was involved in copolymerization reaction at 75° C. for 5 h. The polymer mother liquid containing the maleic anhydride-based copolymer microspheres obtained by the reaction was subjected to solid-liquid separation using a three-feet centrifuge. In order to ensure safety, the reaction liquid needed to be cooled down to 30° C. (temperature decrease time of 1 h). The separation time was 2 h/batch (the number of batches depended on whether the filter material was blocked or not). After separation, the centrifuge was stopped for 1 h. The separation gave a separated solid-containing phase.

The separated solid-containing phase was manually added to an ionomer reactor (material transfer and atmosphere replacement time of 1 h). 1,000 kg of a 2.5% by weight methanol solution of sodium hydroxide was added from an alkali liquid tank for reaction at 50° C. for 1 h.

The reaction liquid of maleic acid ionomer microspheres obtained by the reaction was subjected to solid-liquid separation using a three-feet centrifuge. To ensure safety, the reaction liquid needed to be cooled down to 30° C. (the temperature decrease time was 0.5 h). The separation time was 2 h/batch (the number of batches depended on whether the filter material was blocked or not). After separation, the centrifuge was stopped for 1 h. The separation gave a centrifuged slag phase.

The centrifuged slag phase was manually added to a washing vessel (material transfer and atmosphere replacement time of 1 h). Methanol for washing was sent from the alcohol storage tank to the washing vessel by a metering pump and stirred for 1 h. The obtained washing liquid was added to a three-feet centrifuge by a metering pump for separation, and the separation time was 2 h/batch (the number of batches depended on whether the filter material was blocked or not). After separation, the centrifuge was stopped for 1 h. A slag phase was obtained.

The slag phase was manually added to the rake vacuum dryer G-41 (material transfer and atmosphere replacement time of 1 h), where the slag phase was dried. The drying temperature was 140° C. (temperature rise time of 1 h), pressure was 80 mbar, and the residence time was 4 h. The condenser had a condensation temperature of 0° C. Cross-linked α-methyl styrene/maleic acid ester sodium salt ionomer microspheres were obtained with a yield of 214 kg.

The batch operation had a production efficiency of 7.8 kg/h (in each working section, one batch of solid-liquid separation was performed using a three-feet centrifuge).

From the results of the above Examples and Comparative Example, it can be seen that the use of Examples F1-F4 according to the invention can achieve continuous preparation of maleic acid ester ionomers having a cross-linked and microspheric structure, has overcome the separation process involving manual operation between the various units of the preparation system in the prior art, and has the outstanding effects of higher production efficiency and stable production process. Moreover, the production process does not require manual on-site operation, involves no air exposure operation of organic solvent and has low harm to personnel and the environment.

Example G1

Isoamyl acetate was stored in the reaction solvent storage tank V-13. A reaction liquid was formulated in the reaction liquid mixing vessel R-11: 1014 mol of maleic anhydride, 12.2 mol of azobisisobutyronitrile, 200 mol of divinylbenzene, 1000 mol of α-methyl styrene and 1000 L of isoamyl acetate.

The reaction liquid was fed to the copolymerization reactor R-12 (two stirred tank reactors in parallel) for copolymerization reaction at 75° C. for 5 h under a nitrogen atmosphere. The polymer mother liquid containing the maleic anhydride-based copolymer microspheres obtained by the reaction was added to the first disc centrifuge S-21 through a metering pump (flow rate of 100 kg/h) for a continuous first separation (separation factor of 9000). The separation liquid-I obtained by separation passed through the first online turbidimeter A-21. When the turbidity was less than 0.1% by weight, it was sent to the separation liquid storage tank V-25, and when the turbidity was greater than 0.1% by weight, it was returned to the copolymerization reactor R-12. The separated solid-containing phase obtained by centrifugal separation was sent to the ionomer reactor R-32.

A 10% by weight aqueous solution of sodium hydroxide was formulated in the alkali dissolution vessel R-21, and was added to the alkali liquid tank V-31 for later use. While the separated solid-containing phase entered into the ionomer reactor R-32 (stirred tank reactor), the alkali liquid in the alkali liquid tank V-31 was sent into the ionomer reactor R-32 by a metering pump at a flow rate of 20 kg/h (relative to 100 mol of maleic anhydride, sodium hydroxide was used in an amount of 80 mol). Reaction was performed at 50° C., and the residence time was 1 h.

The product obtained from the reaction in the ionomer reactor R-32 was continuously fed from the bottom to the second disc centrifuge S-22 by a metering pump (flow rate of 50 kg/h) for a second separation (separation factor of 9000) to obtain a centrifuged slag phase containing ionomer microspheres, an aqueous phase and a separation liquid-II; the separation liquid-II was sent to the separation liquid storage tank V-25 for reuse after refinement, the aqueous phase was sent to the alkali dissolution vessel R-21 for reuse, and the centrifuged slag phase was sent to the washing vessel R-22 based on the material level difference. The effect of the second separation could be judged by the second online turbidimeter A-22 and the third online turbidimeter A-31 to control the turbidity. When the turbidity of the aqueous phase and the separation liquid-II was greater than 0.1% by weight, they were returned to the ionomer reactor R-32, when the turbidity of the aqueous phase was less than 0.1% by weight, it was sent to the alkali dissolution vessel R-21, and when the turbidity of the separation liquid-II was less than 0.1% by weight, it was sent to the separation liquid storage tank V-25.

The methanol in the alcohol storage tank V-27 was sent to the washing vessel R-22 by a metering pump at a flow rate of 143 kg/h for an alcohol washing of the centrifuged slag phase, with the residence time being 1 h. The alcohol washed product was sent to the third disc centrifuge S-31 by a metering pump (flow rate of 173 kg/h) for a third separation (separation factor of 9000). The obtained washing clear liquid was sent to the clear liquid storage tank V-26 when the turbidity was less than 0.1% by weight as determined by the fourth online turbidimeter A-41, and it was returned to the washing vessel R-22 when the turbidity was greater than 0.1% by weight. The obtained ionomer slag phase was sent to the dryer G-41.

The ionomer slag phase was sent to the rake vacuum dryer G-41 (43 kg/h) based on the material level difference, where the slag phase was dried. The drying temperature was 140° C., the pressure was 80 mbar, and the residence time was 4 h. The condenser E-41 had a condensation temperature of 0° C. Cross-linked maleic acid ionomer microspheres with a yield of 16.3 kg/h were obtained.

Figure 11:
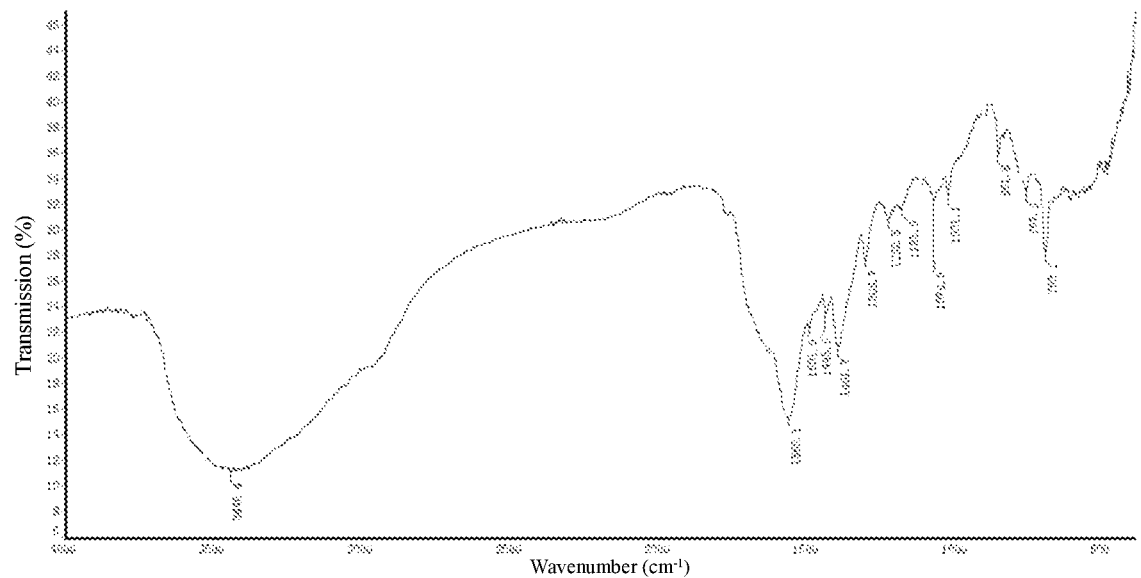
FIG. 11 is an infrared spectrum of the maleic acid ionomer microspheres obtained in Example G1.
Figure 12:
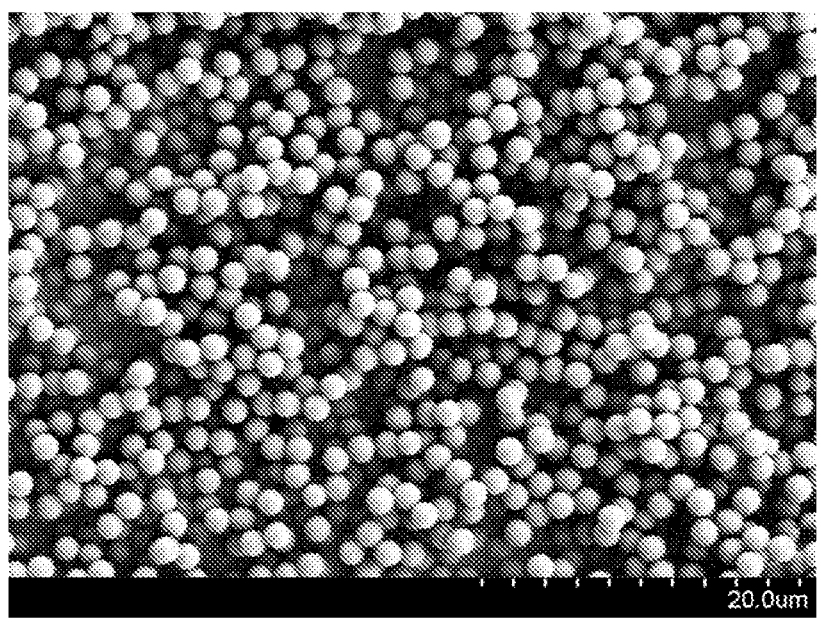
FIG. 12 is a scanning electron micrograph of the maleic acid ionomer microspheres obtained in Example G1.

Infrared spectrum analysis of the microspheres, as shown in FIG. 11, showed the characteristic peak of maleic acid sodium salt and the characteristic peak of aromatic ring, proving the existence of the structure of the target ionomer. Scanning electron microscope analysis of the microspheres, as shown in FIG. 12, showed that the obtained microspheres had a microspheric structure; the average particle diameter was determined to be 1521 nm. The cross-linking degree was determined to be 81%.

The stirred tank reactors R-12B and R-12A were connected in parallel and discharged the materials alternately.

The separation liquid in the separation liquid storage tank V-25 and the clear liquid in the clear liquid storage tank V-26 were respectively introduced to the reaction solvent rectification column T-52 in the reaction solvent recovery device and the alcohol rectification column T-51 in the alcohol solvent recovery device, to respectively recover the reaction solvent and methanol for reuse. The conditions for methanol recovery and reaction solvent recovery were as follows:

|  | Alcohol rectification column T-51 | Reaction solvent rectification column T-52 |
| --- | --- | --- |
| Column top temperature/° C. | 68.9 | 74.0 |
| Column bottom temperature/° C. | 156.3 | 173.5 |
| Operation pressure/bar (gauge pressure) | 1.4 bar | −0.9 bar |
| Reflux ratio | 0.13 | 0.3 |

Example G2

Isoamyl acetate was stored in the reaction solvent storage tank V-13. A reaction liquid was formulated in the reaction liquid mixing vessel R-11: 1014 mol of maleic anhydride, 10.14 mol of azobisisobutyronitrile, 150 mol of divinylbenzene, 750 mol of α-methyl styrene and 900 L of isoamyl acetate.

The reaction liquid was fed to the tubular reactor R-12 at a feed rate of 100 kg/h, under a nitrogen atmosphere, the temperature of the outlet of the tubular reactor R-12 was controlled at 90° C., and the residence time was 3 hours. The polymer mother liquid containing the maleic anhydride-based copolymer microspheres obtained by the reaction was added from the outlet of the reactor R-12 (flow rate of 100 kg/h) to the first disc centrifuge S-21 for a continuous first separation (separation factor of 12000). The separation liquid obtained by separation passed through the first online turbidimeter A-21. When the turbidity was less than 0.1% by weight, it was sent to the separation liquid storage tank V-25, and when the turbidity was greater than 0.1% by weight, it was returned to the copolymerization reactor R-12. The separated solid-containing phase obtained by centrifugal separation was sent to the ionomer reactor R-32.

A 20% by weight aqueous solution of potassium hydroxide was formulated in the alkali dissolution vessel R-21, and was added to the alkali liquid tank V-31 for later use. While the separated solid-containing phase entered into the ionomer reactor R-32 (tubular reactor), the alkali liquid in the alkali liquid tank V-31 was sent into the ionomer reactor R-32 by a metering pump at a flow rate of 16 kg/h (relative to 100 mol of maleic anhydride, potassium hydroxide was used in an amount of 100 mol). The reactor temperature was controlled at 50° C., and the residence time was 1 h.

The product obtained from the reaction in the ionomer reactor R-32 was continuously fed from the outlet to the second disc centrifuge S-22 by a metering pump (flow rate of 46 kg/h) for a second separation (separation factor of 12000) to obtain a centrifuged slag phase containing ionomer microspheres, an aqueous phase and a separation liquid-II; the separation liquid-II was sent to the separation liquid storage tank V-25 for reuse after refinement, the aqueous phase was sent to the alkali dissolution vessel R-21 for reuse, and the centrifuged slag phase was sent to the washing vessel R-22 based on the material level difference. The effect of the second separation could be judged by the second online turbidimeter A-22 and the third online turbidimeter A-31 to control the turbidity. When the turbidity of the aqueous phase and the separation liquid-II was greater than 0.1% by weight, they were returned to the ionomer reactor R-32, when the turbidity of the aqueous phase was less than 0.1% by weight, it was sent to the alkali dissolution vessel R-21, and when the turbidity of the separation liquid-II was less than 0.1% by weight, it was sent to the separation liquid storage tank V-25.

The methanol for washing in the alcohol storage tank V-27 was sent to the washing vessel R-22 by a metering pump at a flow rate of 133 kg/h for an alcohol washing of the centrifuged slag phase, with the residence time being 1 h. The alcohol washed product was sent to the second disc centrifuge S-31 by a metering pump (flow rate of 167 kg/h) for a third separation (separation factor of 12000). The obtained washing clear liquid was sent to the clear liquid storage tank V-26 when the turbidity was less than 0.1% by weight as determined by the fourth online turbidimeter A-41, and it was returned to the washing vessel R-22 when the turbidity was greater than 0.1% by weight. The obtained ionomer slag phase was sent to the dryer G-41.

The ionomer slag phase was sent to the rake vacuum dryer G-41 (44 kg/h) based on the material level difference, where the slag phase was dried. The drying temperature was to 50° C., the pressure was 10 mbar, and the residence time was 4 h. The condenser E-41 had a condensation temperature of 0° C. Cross-linked maleic acid ionomer microspheres with a yield of 16.5 kg/h were obtained.

Infrared spectrum analysis of the microspheres showed the characteristic peak of maleic acid potassium salt and the characteristic peak of aromatic ring, proving the existence of the structure of the target ionomer. Scanning electron microscope analysis of the microspheres showed that the obtained microspheres had a microspheric structure; the average particle diameter was determined to be 1600 nm. The cross-linking degree was determined to be 78%.

The separation liquid in the separation liquid storage tank V-25 and the clear liquid in the clear liquid storage tank V-26 were respectively introduced to the reaction solvent rectification column T-52 in the reaction solvent recovery device and the alcohol rectification column T-51 in the alcohol solvent recovery device, to respectively recover the reaction solvent and methanol for reuse. The conditions for methanol recovery and reaction solvent recovery were as follows:

|  | Alcohol rectification column T-51 | Reaction solvent rectification column T-52 |
| --- | --- | --- |
| Column top temperature/° C. | 68.9 | 74.0 |
| Column bottom temperature/° C. | 156.3 | 173.5 |
| Operation pressure/bar (gauge pressure) | 1.4 bar | −0.9 bar |
| Reflux ratio | 0.13 | 0.3 |

Example G3

Isoamyl acetate was stored in the reaction solvent storage tank V-13. A reaction liquid was formulated in the reaction liquid mixing vessel R-11: 1014 mol of maleic anhydride, 20 mol of azobisisobutyronitrile, 180 mol of divinylbenzene, 850 mol of α-methyl styrene and 850 L of isoamyl acetate.

The reaction liquid was fed to the baffle reactor R-12 at a feed rate of 100 kg/h, under a nitrogen atmosphere, the temperature of the outlet of the baffle reactor R-12 was controlled at 85° C., and the residence time was 3 hours.

The polymer mother liquid containing the maleic anhydride-based copolymer microspheres obtained by the reaction was added from the outlet of the reactor R-12 (flow rate of 100 kg/h) to the first disc centrifuge S-21 for a continuous first separation (separation factor of 14000). The separation liquid obtained by separation passed through the first online turbidimeter A-21. When the turbidity was less than 0.1% by weight, it was sent to the separation liquid storage tank V-25, and when the turbidity was greater than 0.1% by weight, it was returned to the copolymerization reactor R-12. The separated solid-containing phase obtained by centrifugal separation was sent to the ionomer reactor R-32.

A 50% by weight aqueous solution of sodium hydroxide was formulated in the alkali dissolution vessel R-21, and was added to the alkali liquid tank V-31 for later use. While the separated solid-containing phase entered into the ionomer reactor R-32 (baffle reactor), the alkali liquid in the alkali liquid tank V-31 was sent into the ionomer reactor R-32 by a metering pump at a flow rate of 1.1 kg/h (relative to 100 mol of maleic anhydride, sodium hydroxide was used in an amount of 20 mol). The reactor temperature was controlled at 30° C., and the residence time was 0.5 h.

The product obtained from the reaction in the ionomer reactor R-32 was continuously fed from the bottom to the second disc centrifuge S-22 by a metering pump (flow rate of 33 kg/h) for a second separation (separation factor of 14000) to obtain a centrifuged slag phase containing ionomer microspheres, an aqueous phase and a separation liquid-II; the separation liquid-II was sent to the separation liquid storage tank V-25 for reuse after refinement, the aqueous phase was sent to the alkali dissolution vessel R-21 for reuse, and the centrifuged slag phase was sent to the washing vessel R-22 based on the material level difference. The effect of the second separation could be judged by the second online turbidimeter A-22 and the third online turbidimeter A-31 to control the turbidity. When the turbidity of the aqueous phase and the separation liquid-II was greater than 0.1% by weight, they were returned to the ionomer reactor R-32, when the turbidity of the aqueous phase was less than 0.1% by weight, it was sent to the alkali dissolution vessel R-21, and when the turbidity of the separation liquid-II was less than 0.1% by weight, it was sent to the separation liquid storage tank V-25.

The methanol for washing in the alcohol storage tank V-27 was sent to the washing vessel R-22 by a metering pump at a flow rate of 180 kg/h for an alcohol washing of the centrifuged slag phase, with the residence time being 1 h. The alcohol washed product was sent to the third disc centrifuge S-31 by a metering pump (flow rate of 213 kg/h) for a third separation (separation factor of 14000). The obtained washing clear liquid was sent to the clear liquid storage tank V-26 when the turbidity was less than 0.1% by weight as determined by the fourth online turbidimeter A-41, and it was returned to the washing vessel R-22 when the turbidity was greater than 0.1% by weight.

The ionomer slag phase was sent to the rake vacuum dryer G-41 (47 kg/h) based on the material level difference, where the slag phase was dried. The drying temperature was 90° C., the pressure was 100 mbar, and the residence time was 4 h. The condenser had a condensation temperature of 0° C. Cross-linked maleic acid ionomer microspheres with a yield of 17.8 kg/h were obtained.

Infrared spectrum analysis of the microspheres showed the characteristic peak of maleic acid sodium salt and the characteristic peak of aromatic ring, proving the existence of the structure of the target polymer. Scanning electron microscope analysis of the microspheres showed that the obtained microspheres had a microspheric structure; the average particle diameter was determined to be 2000 nm. The cross-linking degree was determined to be 80%.

The separation liquid in the separation liquid storage tank V-25 and the clear liquid in the clear liquid storage tank V-26 were respectively introduced to the reaction solvent rectification column T-52 in the reaction solvent recovery device and the alcohol rectification column T-51 in the alcohol solvent recovery device, to respectively recover the reaction solvent and methanol for reuse. The conditions for methanol recovery and reaction solvent recovery were as follows:

|  | Alcohol rectification column T-51 | Reaction solvent rectification column T-52 |
| --- | --- | --- |
| Column top temperature/° C. | 68.9 | 74.0 |
| Column bottom temperature/° C. | 156.3 | 173.5 |
| Operation pressure/bar (gauge pressure) | 1.4 bar | −0.9 bar |
| Reflux ratio | 0.13 | 0.3 |

Comparative Example G1

The following reaction liquid was formulated in the polymer reaction tank: 1014 mol of maleic anhydride, 12.2 mol of azobisisobutyronitrile, 200 mol of divinylbenzene, 1000 mol of α-methyl styrene, and 1000 L of isoamyl acetate.

The reaction liquid was heated to 75° C. (temperature rise time of 1 h), and was involved in copolymerization reaction at 75° C. for 5 h. The polymer mother liquid containing the maleic anhydride-based copolymer microspheres obtained by the reaction was subjected to solid-liquid separation using a three-feet centrifuge. In order to ensure safety, the reaction liquid needed to be cooled down to 30° C. (temperature decrease time of 1 h). The separation time was 2 h/batch (the number of batches depended on whether the filter material was blocked or not). After separation, the centrifuge was stopped for 1 h. The separation gave a separated solid-containing phase.

The separated solid-containing phase was manually added to the ionomer reactor (material transfer and atmosphere replacement time of 1 h). 250 kg of a 10% by weight aqueous solution of sodium hydroxide was added from the alkali liquid tank for reaction at 50° C. for 1 h. The reaction liquid of maleic acid ionomer microspheres obtained by the reaction was subjected to solid-liquid separation using a three-feet centrifuge. To ensure safety, the reaction liquid needed to be cooled down to 30° C. (the temperature decrease time was 0.5 h). The separation time was 2 h/batch (the number of batches depended on whether the filter material was blocked or not). After separation, the centrifuge was stopped for 1 h. The separation gave a centrifuged slag phase.

The centrifuged slag phase was manually added to the washing vessel (material transfer and atmosphere replacement time of 1 h). Methanol for washing was sent from the alcohol storage tank to the washing vessel by a metering pump and stirred for 1 h. The obtained washing liquid was added to a three-feet centrifuge by a metering pump for separation, and the separation time was 2 h/batch (the number of batches depended on whether the filter material was blocked or not). After separation, the centrifuge was stopped for 1 h. A slag phase was obtained.

The slag phase was manually added to the rake vacuum dryer G-41 (material transfer and atmosphere replacement time of 1 h), where the slag phase was dried. The drying temperature was 140° C. (temperature rise time of 1 h), pressure was 80 mbar, and the residence time was 4 h. The condenser had a condensation temperature of 0° C. Cross-linked α-methyl styrene/maleic acid ionomer microspheres were obtained with a yield of 203 kg.

The batch operation had a production efficiency of 7.7 kg/h (in each working section, one batch of solid-liquid separation was performed using a three-feet centrifuge).

From the results of the above Examples and Comparative Example, it can be seen that the use of Examples G1-G3 according to the invention can achieve continuous preparation of maleic acid ionomers having a cross-linked and microspheric structure, has overcome the separation process involving manual operation between the various units of the preparation system in the prior art, and has the outstanding effects of higher production efficiency and stable production process. Moreover, the production process does not require manual on-site operation, involves no air exposure operation of organic solvent and has low harm to personnel and the environment.

The preferred embodiments of the invention have been described above in detail, but the invention is not limited thereto. Within the scope of the technical concept of the invention, a variety of simple modifications can be made to the technical solution of the invention, including the combination of the various technical features in any other suitable manner. These simple modifications and combinations should also be regarded as the disclosure of the invention, and they all belong to the protection scope of the invention.

The endpoints of the ranges and any values therein as disclosed herein are not limited to the precise ranges or values, and these ranges or values should be understood as including values close to these ranges or values. For numerical ranges, a combination can be made between the end values of the various ranges, between the end value and individual point value of the various ranges, and between the individual point values to obtain one or more new numerical ranges, and these numerical ranges shall be considered to be specifically disclosed herein.

| List of reference signs | | |
|---|---|---|
| V-13 reaction solvent storage tank | R-11 reaction liquid mixing vessel | R-12 copolymerization reactor |
| S-21 first disc centrifuge | A-21 first online turbidimeter | V-25 separation liquid storage tank |
| R-22 washing vessel | S-22 second disc centrifuge | A-22 second online turbidimeter |
| V-26 clear liquid storage tank | V-27 alcohol storage tank | V-31 alkali liquid tank |
| R-32 ionomer reactor | S-31 third disc centrifuge | A-31 third online turbidimeter |
| G-41 dryer | E-41 condenser | V-41 dried condensate tank |
| T-51 alcohol rectification column | E-51 alcohol heat exchanger | E-52 residue liquid reboiler |
| V-51 alcohol condensate tank | T-52 reaction solvent rectification column | E-53 solvent heat exchanger |
| E-54 waste liquid reboiler | V-53 solvent condensate tank | V-55 feed tank |
| R-21 alkali dissolution vessel | A-41 fourth online turbidimeter | |

The invention claimed is:

1. A microspheric ionomer having a cross-linked structure, characterized in that the ionomer comprises a structure unit A represented by formula (1), a structure unit B represented by formula (2), and a cross-linking structural unit provided by a cross-linking agent,

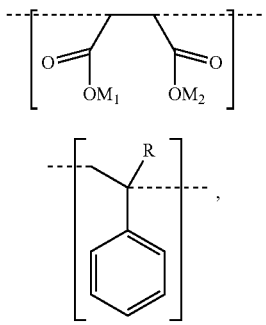

formula (1)

formula (2)

wherein:
M$_1$ and M$_2$ are each independently selected from the group consisting of H, a metal cation and a linear, branched or cyclic C$_1$-C$_{20}$ saturated alkyl group, and R is H or methyl; and
at least part of the structure units A in the ionomer comprises the metal cation.

2. The ionomer according to claim 1, wherein the molar content of the metal cation in the ionomer comprises 10-120% of the total molar amount of structure unit A in the ionomer.

3. The ionomer according to claim 1, wherein the cross-linking degree of the ionomer is ≥65%.

4. The ionomer according to claim 1, wherein the ionomer has an average particle size of 150 to 2000 nm.

5. The ionomer according to claim 1, wherein the molar ratio between the structure unit A and the structure unit B is 100:(100-120).

6. The ionomer according to claim 1, wherein the molar ratio between the structure unit A and the cross-linking structural unit is 100:(1-40).

7. The ionomer according to claim 1, wherein the cross-linking agent is selected from divinylbenzene and an acrylate cross-linking agent containing at least two acrylate groups, wherein the structural formula of the acrylate groups is: —O—C(O)—C(R')═CH$_2$, with R' being H or C$_1$-C$_4$ alkyl.

8. The ionomer according to claim 1, wherein the C$_1$-C$_{20}$ saturated alkyl group is selected from the group consisting of methyl, ethyl, n-propyl, isopropyl, tert-butyl, n-butyl, isobutyl, n-pentyl, n-hexyl, n-heptyl, n-octyl, 2-methylbutyl, 3-methylbutyl, cyclohexyl, n-nonyl, isononyl, decyl, 2-propylheptyl, 2-ethylhexyl, dodecyl, tetradecyl, cetyl, and stearyl.

9. The ionomer according to claim 1, wherein the metal cation is selected from the group consisting of Li+, Na+, K+, and the monovalent equivalent of Ca$^{2+}$, Mg$^{2+}$, Ba$^{2+}$ and Zn$^{2+}$.

10. A method for preparing the ionomer according to claim 1, comprising:
(1) contacting maleic anhydride, a monomer MB providing a structure unit B represented by formula (2), and a cross-linking agent, in an organic solvent, in the presence of an initiator, to react to form a product; and
(2) ring-opening the maleic anhydride unit in the product obtained in step (1).

11. The method according to claim 10, wherein in step (1), the conditions of the reaction make the cross-linking degree of the ionomer ≥65%.

12. The method according to claim 10, wherein in step (1), the cross-linking agent is used in an amount of 1 to 40 mol, relative to 100 mol of maleic anhydride.

13. The method according to claim 10, wherein in step (1), the organic solvent comprises an alkyl ester of organic acid, optionally mixed with an alkane and/or an aromatic hydrocarbon.

14. The method according to claim 10, wherein in step (1), the organic solvent is used in an amount of 50 to 150 L, relative to 100 mol of maleic anhydride.

15. The method according to claim 10, wherein step (2) is carried out by reacting the product obtained in step (1) with a base for salinization in the presence of water, to obtain cross-linked maleic acid ionomer microspheres.

16. The method according to claim 15, wherein the base is selected from metal hydroxides and metal acetates.

17. The method according to claim 15, wherein the base is used in an amount of 10 to 200 mol, relative to 100 mol of maleic anhydride.

18. The method according to claim 10, wherein step (2) is performed by mixing and reacting the product obtained in step (1) with a base and a saturated monohydric alcohol, to obtain cross-linked maleic acid ester ionomer microspheres.

19. The method according to claim 18, wherein the base is at least one selected from the group consisting of metal hydroxides, metal acetates, and metal alkoxides.

20. The method according to claim 18, wherein the base is used in an amount of 5 to 100 mol, relative to 100 mol of maleic anhydride.

21. The method according to claim 18, wherein the saturated monohydric alcohol is selected from $C_1$-$C_{20}$ saturated monohydric alcohols.

22. The method according to claim 18, wherein the saturated monohydric alcohol is used in an amount of 100-20000 mol, relative to 100 mol of maleic anhydride.

23. The method according to claim 10, wherein the ionomer is cross-linked maleic acid ester ionomer microsphere, and the method comprises:
(1) subjecting maleic anhydride and a monomer MB represented by formula (I) to copolymerization reaction in the presence of an initiator, a cross-linking agent, and a reaction solvent, in a copolymerization unit, to obtain a polymer mother liquid containing maleic anhydride-based copolymer microspheres,

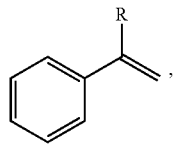

formula (I)

wherein R is H or methyl;
(2) subjecting the polymer mother liquid to a continuous first separation to obtain a separated solid-containing phase and a separation liquid-I;
(3) feeding the separated solid-containing phase into a washing unit, for performing at least one alcohol washing and a continuous second separation, to obtain a copolymer slag phase and a washing clear liquid;
(4) reacting the copolymer slag phase with an alcohol solution of a base, and continuously subjecting the obtained product to a third separation, to obtain a centrifuged slag phase containing ionomer microspheres and a separation liquid-II;
(5) sending the centrifuged slag phase to a drying unit for drying, to obtain cross-linked maleic acid ester ionomer microspheres; and
(6) introducing the separation liquid-I, separation liquid-II and washing clear liquid to a solvent recovery unit, and returning the recovered solvent and recovered alcohol obtained by recovery to steps (1) and (3), respectively.

24. The method according to claim 23, wherein the first separation in step (2) has a separation factor of greater than 9,000.

25. The method according to claim 23, wherein the second separation in step (3) has a separation factor of greater than 9,000.

26. The method according to claim 23, wherein the third separation in step (4) has a separation factor of greater than 9,000.

27. The method according to claim 23, wherein in step (3), the alcohol is selected from methanol and ethanol.

28. The method according to claim 10, wherein the ionomer is cross-linked maleic acid ionomer microspheres, and the method comprises:
(1) subjecting maleic anhydride and a monomer MB represented by formula (I) to copolymerization reaction in the presence of an initiator, a cross-linking agent, and a reaction solvent, in a copolymerization unit, to obtain a polymer mother liquid containing maleic anhydride-based copolymer microspheres,

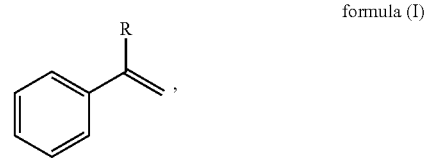

formula (I)

wherein R is H or methyl;
(2) subjecting the polymer mother liquid to a continuous first separation to obtain a separated solid-containing phase and a separation liquid-I;
(3) reacting the separated solid-containing phase with an alkali liquid, and continuously subjecting the obtained product to a second separation, to obtain a centrifuged slag phase containing ionomer microspheres, an aqueous phase and a separation liquid-II;
(4) introducing the centrifuged slag phase to a washing unit, for performing at least one alcohol washing and a third separation, to obtain an ionomer slag phase and a washing clear liquid;
(5) sending the ionomer slag phase to a drying unit for drying, to obtain cross-linked maleic acid ionomer microspheres; and
(6) introducing the separation liquid-I, separation liquid-II and washing clear liquid to a solvent recovery unit, and returning the recovered solvent and recovered alcohol obtained by recovery to steps (1) and (4), respectively.

29. The method according to claim 28, wherein the first separation in step (2) has a separation factor of greater than 9,000.

30. The method according to claim 28, wherein the second separation in step (3) has a separation factor of greater than 9,000.

31. The method according to claim 28, wherein the third separation in step (4) has a separation factor of greater than 9,000.

32. The method according to claim 28, wherein in step (4), the alcohol is selected from methanol and ethanol.

33. The method according to claim 28, wherein in step (3), the reaction is performed at a temperature of 20 to 80° C. for a time period of 0.5 to 8 h.

34. The ionomer according to claim 5, wherein the molar ratio between the structure unit A and the structure unit B is 100:(100-105).

35. The ionomer according to claim 6, wherein the molar ratio between the structure unit A and the cross-linking structural unit is 100:(1-30).

36. The ionomer according to claim 7, wherein the cross-linking agent is at least one selected from the group consisting of divinylbenzene, propylene glycol bis(meth) acrylate, ethylene glycol bis(meth) acrylate, trimethylolpropane tri(meth)acrylate, bis(trimethylolpropane) tetra(meth) acrylate, polyethylene glycol di(meth)acrylate, phthalic diethyleneglycol diacrylate, pentaerythritol tetraacrylate, dipentaerythritol pentaacrylate, dipentaerythritol hexaacrylate, and ethoxylated polyfunctional acrylate.

37. The method according to claim 12, wherein in step (1), the cross-linking agent is used in an amount of 10 to 20 mol, relative to 100 mol of maleic anhydride.

38. The method according to claim 13, wherein in step (1), the organic solvent comprises isoamyl acetate, optionally mixed with an alkane and/or an aromatic hydrocarbon.

39. The method according to claim 14, wherein in step (1), the organic solvent is used in an amount of 75 to 100 L, relative to 100 mol of maleic anhydride.

40. The method according to claim 16, wherein the base is at least one selected from the group consisting of lithium hydroxide, sodium hydroxide, potassium hydroxide, calcium hydroxide, barium hydroxide, zinc hydroxide, magnesium hydroxide, lithium acetate, sodium acetate, potassium acetate, calcium acetate, barium acetate, and zinc acetate.

41. The method according to claim 19, wherein the base is at least one selected from the group consisting of lithium hydroxide, sodium hydroxide, potassium hydroxide, calcium hydroxide, barium hydroxide, zinc hydroxide, magnesium hydroxide, lithium acetate, sodium acetate, potassium acetate, calcium acetate, barium acetate, zinc acetate, sodium methoxide, sodium ethoxide, sodium propoxide, sodium isopropoxide, sodium tert-butoxide, sodium tert-pentoxide, sodium isooctoxide, potassium methoxide, lithium methoxide, zinc methoxide, magnesium methoxide, calcium methoxide, potassium ethoxide, barium ethoxide, calcium ethoxide, lithium ethoxide, and potassium tert-butoxide.

42. The method according to claim 21, wherein the saturated monohydric alcohol is at least one selected from the group consisting of methanol, ethanol, propanol, isopropanol, butanol, isobutanol, tert-butanol, pentanol, 2-methylbutanol, 3-methylbutanol, hexanol, cyclohexanol, heptanol, octanol, nonanol, isononanol, decanol, 2-propylheptanol, 2-ethylhexanol, dodecanol, tetradecanol, cetyl alcohol, and stearyl alcohol.

43. The method according to claim 24, wherein the first separation in step (2) has a separation factor in a range of 9,000-60,000.

44. The method according to claim 25, wherein the second separation in step (3) has a separation factor in a range of 9,000-60,000.

45. The method according to claim 26, wherein the third separation in step (4) has a separation factor in a range of 9,000-60,000.

46. The method according to claim 29, wherein the first separation in step (2) has a separation factor in a range of 9,000-60,000.

47. The method according to claim 30, wherein the second separation in step (3) has a separation factor in a range of 9,000-60,000.

48. The method according to claim 31, wherein the third separation in step (4) has a separation factor in a range of 9,000-60,000.

49. A polyethylene terephthalate composition, comprising the ionomer according to claim 1 as a nucleating agent.

50. A polyethylene terephthalate composition, comprising the ionomer prepared by the method according to claim 10 as a nucleating agent.

* * * * *